(12) United States Patent
Kim et al.

(10) Patent No.: US 10,226,886 B2
(45) Date of Patent: Mar. 12, 2019

(54) SLIM INJECTION MOLDING APPARATUS

(71) Applicant: SAMSUNG ELECTRONICS CO., LTD., Suwon (KR)

(72) Inventors: Hak-do Kim, Gwangju (KR);
Min-sang Park, Gwangju (KR);
Hwan-soo Lee, Gwangju (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 598 days.

(21) Appl. No.: 14/919,399

(22) Filed: Oct. 21, 2015

(65) Prior Publication Data

US 2016/0214297 A1 Jul. 28, 2016

(30) Foreign Application Priority Data

Jan. 27, 2015 (KR) .................. 10-2015-0012654
Apr. 8, 2015 (KR) .................. 10-2015-0049524

(51) Int. Cl.
*B29C 45/40* (2006.01)
*B29C 45/44* (2006.01)
*B29C 45/33* (2006.01)

(52) U.S. Cl.
CPC .......... *B29C 45/44* (2013.01); *B29C 45/332* (2013.01)

(58) Field of Classification Search
CPC ... B29C 45/44; B29C 45/332; B29C 45/4471; B29C 2045/4094; B29C 45/4005
USPC .................................................. 425/DIG. 58
See application file for complete search history.

(56) References Cited

U.S. PATENT DOCUMENTS

| | | | | | |
|---|---|---|---|---|---|
| 3,049,759 | A | * | 8/1962 | Eberhardt | B29C 45/33 425/438 |
| 3,293,697 | A | * | 12/1966 | Balint | B29C 45/26 264/318 |
| 3,387,334 | A | * | 6/1968 | Belanger | B29C 45/44 425/112 |
| 3,707,342 | A | * | 12/1972 | Lohmann | B29C 45/12 425/450.1 |

(Continued)

FOREIGN PATENT DOCUMENTS

| CN | 201587070 | 9/2010 |
|---|---|---|
| CN | 202225394 | 5/2012 |

(Continued)

OTHER PUBLICATIONS

Chinese Office Action dated Aug. 29, 2017 in Chinese Patent Application No. 201510849727.1.

*Primary Examiner* — Yogendra N Gupta
*Assistant Examiner* — Emmanuel S Luk
(74) *Attorney, Agent, or Firm* — Staas & Halsey LLP

(57) ABSTRACT

An injection molding apparatus is usable in an injection machine to form an injection product. The slim injection molding apparatus includes a hot runner plate attachable to one side clamping plate of the injection machine and provided with a hot runner system; an upper core disposed in the hot runner plate; a lower core attachable to an opposite side clamping plate of the injection machine to face the upper core, the lower core configured to couple with the upper core to define a cavity corresponding to the injection product when the lower core is coupled to the upper core; and an ejecting core disposed in the lower core, the ejecting core configured to push the injection product upward when the upper core is separated from the lower core.

24 Claims, 29 Drawing Sheets

(56) References Cited

U.S. PATENT DOCUMENTS

| | | | | |
|---|---|---|---|---|
| 3,811,645 A * | 5/1974 | Feist | B29C 45/332 | 249/68 |
| 4,209,160 A * | 6/1980 | Vanotti | B29C 37/0014 | 249/162 |
| 4,502,659 A * | 3/1985 | Stephenson | B29C 45/4471 | 249/66.1 |
| 4,515,342 A * | 5/1985 | Boskovic | B29C 45/332 | 249/122 |
| 4,570,897 A * | 2/1986 | Von Holdt | B29C 45/44 | 249/144 |
| 4,632,357 A * | 12/1986 | Von Holdt | B29C 45/0017 | 249/122 |
| 4,648,834 A * | 3/1987 | Von Holdt | B29C 45/44 | 264/334 |
| 4,768,747 A * | 9/1988 | Williams | B29C 33/48 | 249/142 |
| 4,854,849 A * | 8/1989 | Sudo | B29C 45/4435 | 249/180 |
| 4,923,388 A * | 5/1990 | Nakamura | B29C 45/33 | 425/450.1 |
| 5,112,207 A * | 5/1992 | Pinsonneault | B29C 45/4471 | 249/161 |
| 5,137,442 A * | 8/1992 | Starkey | B29C 33/442 | 249/66.1 |
| 5,185,119 A * | 2/1993 | Schad | B29C 45/12 | 264/297.2 |
| 5,219,594 A * | 6/1993 | Meyer | B29C 45/4435 | 249/180 |
| 5,234,329 A * | 8/1993 | Vandenberg | B29C 45/332 | 249/63 |
| 5,397,226 A * | 3/1995 | Vandenberg | B29C 45/332 | 425/192 R |
| 5,407,344 A * | 4/1995 | Rombalski, Jr. | B29C 45/14065 | 264/318 |
| 5,498,387 A * | 3/1996 | Carter | B29C 45/26 | 264/219 |
| 5,536,161 A * | 7/1996 | Smith | B29C 33/444 | 249/58 |
| 5,551,864 A * | 9/1996 | Boskovic | B29C 45/4435 | 264/334 |
| 5,814,357 A * | 9/1998 | Boskovic | B29C 45/4435 | 264/318 |
| 6,039,558 A * | 3/2000 | Park | B29C 45/4435 | 425/556 |
| 6,416,315 B1 * | 7/2002 | Ciccone | B29C 45/4421 | 425/438 |
| 6,474,977 B1 * | 11/2002 | Wimmer | B29C 33/44 | 425/556 |
| 7,140,868 B1 * | 11/2006 | Steele | B29C 45/2602 | 425/438 |
| 7,309,227 B2 * | 12/2007 | Pierson | B29C 45/44 | 425/441 |
| 7,387,505 B1 * | 6/2008 | Chen | B29C 45/332 | 425/190 |
| 8,029,267 B2 * | 10/2011 | Takao | B29C 45/4435 | 425/444 |
| 8,147,238 B1 * | 4/2012 | Zou | B29C 45/4421 | 425/438 |
| 8,371,842 B2 * | 2/2013 | Li | B29C 45/44 | 425/441 |
| 8,469,696 B2 * | 6/2013 | Navarra Pruna | B29C 45/4435 | 425/556 |
| 8,475,156 B2 * | 7/2013 | Gong | B29C 45/4435 | 425/438 |
| 2006/0269649 A1 * | 11/2006 | Ciccone | B29C 33/0088 | 425/556 |
| 2007/0054006 A1 * | 3/2007 | Pierson | B29C 45/44 | 425/441 |
| 2012/0088004 A1 * | 4/2012 | Wu | B29C 45/332 | 425/444 |
| 2012/0088005 A1 * | 4/2012 | Li | B29C 45/332 | 425/444 |
| 2012/0107447 A1 * | 5/2012 | Li | B29C 45/332 | 425/556 |
| 2012/0141627 A1 * | 6/2012 | Wang | B29C 45/332 | 425/577 |
| 2012/0153540 A1 * | 6/2012 | Kurimoto | B29C 45/33 | 264/328.1 |
| 2012/0321742 A1 * | 12/2012 | Wang | B29C 45/33 | 425/577 |
| 2013/0101693 A1 * | 4/2013 | Wang | B29C 45/332 | 425/161 |
| 2014/0106022 A1 * | 4/2014 | Navarra Pruna | B29C 45/332 | 425/547 |

FOREIGN PATENT DOCUMENTS

| | | |
|---|---|---|
| JP | 8-323823 | 12/1996 |
| JP | 2007-50627 | 3/2007 |
| JP | 2012-91488 | 5/2012 |
| KR | 1992-0005804 | 8/1992 |
| KR | 20-0227970 | 6/2001 |
| KR | 10-2005-0064973 | 6/2005 |

* cited by examiner

SLIM INJECTION MOLDING APPARATUS

CROSS-REFERENCE TO RELATED APPLICATIONS

This application claims priority from Korean Patent Application No. 10-2015-0012654 filed Jan. 27, 2015 and Korean Patent Application No. 10-2015-0049524 filed Apr. 8, 2015 in the Korean Intellectual Property Office, the disclosure of which is incorporated herein by reference in its entirety.

BACKGROUND

1. Field

The present disclosure relates to an injection molding apparatus that is used to produce injection products in an injection machine. More particularly, the present disclosure relates to a slim injection molding apparatus whose height is reduced by removing an upper pushing plate and a lower pushing plate for ejecting injection products.

2. Description of Related Art

As illustrated in FIG. 1, a conventional injection molding apparatus 2000 is formed such that a spacer block 2131 is disposed below a lower molding plate 2111, and a pushing plate 2141 that can move upward and downward is disposed inside the spacer block 2131. Also, the pushing plate 2141 is provided with a plurality of pushing pins 2142 configured to pass through a lower core 2113 disposed on the lower molding plate 2111 and to push an injection product.

Accordingly, after an injection operation forming an injection product in a cavity 2101 and cooling the injection product are completed, when ejecting the injection product, an upper molding plate 2121 moves in a direction away from the lower molding plate 2111 so as to open the cavity 2101 formed by an upper core 2123 and the lower core 2113. After that, the pushing plate 2141 is moved, and thus the injection product is separated from the lower core 2113 by the pushing pins 2142 provided in the pushing plate 2141.

However, since the conventional injection molding apparatus 2000 uses the upper molding plate 2121, the lower molding plate 2111, the spacer block 2131, and the pushing plate 2141, there are problems that the overall size of the molding apparatus is large and material cost and processing cost thereof are expensive.

Also, in order to increase productivity of the injection molding apparatus tandem injection molding apparatuses or stack injection molding apparatuses that can produce two injection products by using two cavities formed in a single injection molding apparatus are used.

Since the tandem injection molding apparatus is configured such that an injection process is performed in one cavity while a formed injection product is cooled in the other cavity, the injection products may be continuously produced so that the productivity may be increased.

However, in a conventional tandem injection molding apparatus 3000, as illustrated in FIG. 2, a spacer block 3131 is disposed below each of a first lower molding plate 3111 and a second lower molding plate 3112, and a pushing plate 3141 that can move upward and downward is disposed inside each of the spacer blocks 3131. Also, the pushing plate 3141 is provided with a plurality of pushing pins 3142 that pass through a lower core 3113 of each of the first lower molding plate 3111 and the second lower molding plate 3112 and push injection products.

Accordingly, after an injection operation forming an injection product in a cavity 3101 and cooling of the injection product are completed, when ejecting the injection product, the first lower molding plate 3111 or the second lower molding plate 3112 moves in an opposite direction from the first upper molding plate 3121 or the second upper molding plate 3122 so as to open the cavity 3101 formed by an upper core 3123 and a lower core 3113. After that, the pushing plate 3141 is moved, and thus the injection product is separated from the lower core 3113 by the pushing pins 3142 disposed in the pushing plate 3141.

However, the conventional tandem injection molding apparatus 3000 needs the two spacer blocks 3131, the two pushing plates 3141, and a plurality of pushing pins 3142 in order to eject the injection product so that a height H of the conventional tandem injection molding apparatus 3000 is high. Accordingly, it is difficult to use the conventional tandem injection molding apparatus in normal injection machines using a normal injection molding apparatus. Therefore, the conventional tandem injection molding apparatus needs a special injection machine having a mold opening distance longer than that of the normal injection machines.

SUMMARY

The present disclosure has been developed in order to overcome the above drawbacks and other problems associated with the conventional arrangement. An aspect of the present disclosure relates to a slim injection molding apparatus whose size, material cost, and processing cost can be reduced because an upper molding plate, a lower molding plate, a spacer block, and a pushing plate are not used or required to be used.

Further, another aspect of the present disclosure relates to a slim injection molding apparatus that can be used as a tandem injection molding apparatus or a stack injection molding apparatus and that can be used in a normal injection machine because an upper pushing plate and a lower pushing plate are not used or required to be used so that an overall height of the injection molding apparatus is lower.

According to an aspect of the present disclosure, a slim injection molding apparatus that is disposed in an injection machine and forms an injection product, the slim injection molding apparatus may include a hot runner plate disposed in one side clamping plate (clamping member) of the injection machine and provided with a hot runner system; an upper core disposed in the hot runner plate; a lower core disposed in an opposite side clamping plate (clamping member) of the injection machine to face the upper core, the lower core configured to a cavity corresponding to the injection product when the lower core is coupled to the upper core; and an ejecting core disposed in the lower core, the ejecting core configured to push up the injection product when the upper core is separated from the lower core.

A length and a width of each of the hot runner plate, the upper core, and the lower core may be same.

The ejecting core may be moved upward and downward by horizontal movement of a slide core disposed in the lower core.

The ejecting core may include an ejecting body disposed to slidably move in the lower core; and an ejecting pin disposed in one side surface of the ejecting body, the ejecting pin formed to be projected from a top surface of the lower core and to push up the injection product when the slide core is away from a center of the lower core.

The ejecting body may be provided with a guide rail inclined upward toward the top surface of the lower core, and the ejecting pin may be provided with a guide groove in which the guide rail is inserted in one end portion of the ejecting pin, and wherein when the ejecting body is moved by the slide core, the ejecting pin is moved along the guide rail.

The ejecting pin may be provided with a receiving portion on which the injection product is received in another end portion of the ejecting pin, and wherein the receiving portion forms the cavity along with the upper core, the lower core, and the slide core.

The lower core may include an ejecting hole in which the ejecting pin is movably inserted.

The upper core may include at least one angular pin, and the slide core may include a guide hole in which the at least one angular pin is movably inserted. When the upper core moves, the slide core may be moved by the at least one angular pin inserted in the guide hole.

The at least one angular pin may be disposed to be inclined downward in a first direction in which the slide core is away from the center of the lower core, and wherein when the upper core is separated from the lower core, the slide core and the ejecting body of the ejecting core are moved in the first direction and the ejecting pin is projected from the top surface of the lower core.

The slim injection molding apparatus may include a fixing plate fixing each of the upper core and the lower core to the clamping plate.

The ejecting core may be moved upward and downward by a vertical movement of an ejector block disposed in the lower core.

The ejector block may be disposed to be vertically moved in an ejector groove formed in the lower core, and forms a portion of the cavity with the lower core. The ejecting core may include an ejecting pin disposed in a side of the ejector block, the ejecting pin formed to be projected from the top surface of the lower core and to push up the injection product when the ejector block is lifted; and an ejecting body disposed below the ejector block and connected to the ejecting pin.

The upper core may include a lift member that is vertically moved, wherein one end of the lift member is connected to the ejector block, and another end of the lift member is inserted in a lift hole formed in the upper core, and when the upper core is lifted, the ejector block is lifted by the lift member.

According to another aspect of the present disclosure, a slim injection molding apparatus that is disposed in an injection machine and forms an injection product, the slim injection molding apparatus may include a hot runner plate provided with a hot runner system; a first core disposed in one side surface of the hot runner plate; and a second core disposed in an opposite side surface of the hot runner plate, wherein each of the first core and the second core may include an upper core disposed in the hot runner plate; a lower core disposed in a clamping plate of the injection machine to face the upper core, the lower core configured to a cavity corresponding to the injection product when the lower core is coupled to the upper core; and an ejecting core disposed in the lower core, the ejecting core configured to push up the injection product when the upper core is separated from the lower core.

A length and a width of each of the hot runner plate, the upper core, and the lower core may be same.

The ejecting core may be moved upward and downward by horizontal movement of a slide core disposed in the lower core.

The ejecting core may include an ejecting body disposed to move with respect to the lower core; and an ejecting pin disposed in one side surface of the ejecting body, the ejecting pin formed to be projected from a top surface of the lower core and to push up the injection product when the slide core is away from a center of the lower core.

The ejecting body may be provided with a guide rail inclined upward toward a bottom surface of the lower core, and the ejecting pin may be provided with a guide groove in which the guide rail is inserted in one end portion of the ejecting pin, and wherein when the ejecting body is moved by the slide core, the ejecting pin is moved along the guide rail.

The upper core may include at least one angular pin, and the slide core may include a guide hole in which the at least one angular pin is movably inserted, wherein when the upper core moves, the slide core is moved by the at least one angular pin inserted in the guide hole, and wherein the at least one angular pin is disposed to be inclined downward in a first direction in which the slide core is away from the center of the lower core.

The ejecting core may be moved upward and downward by a vertical movement of an ejector block disposed in the lower core.

The ejector block may be disposed to be vertically moved in an ejector groove formed in the lower core, and forms a portion of the cavity with the lower core, and wherein the ejecting core may include an ejecting pin disposed in a side of the ejector block, the ejecting pin formed to be projected from the top surface of the lower core and to push up the injection product when the ejector block is lifted; and an ejecting body disposed below the ejector block and connected to the ejecting pin.

The upper core may include a lift member that is vertically moved, wherein one end of the lift member is connected to the ejector block, and another end of the lift member is inserted in a lift hole formed in the upper core, and when the upper core is lifted, the ejector block is lifted by the lift member.

The slim injection molding apparatus may be a tandem injection molding apparatus, and wherein a cavity of the first core and a cavity of the second core are sequentially opened and closed.

The slim injection molding apparatus may be a stack injection molding apparatus, and wherein a cavity of the first core and a cavity of the second core are opened and closed at the same time.

The slim injection molding apparatus may include a first upper molding plate disposed between the first core and the one side surface of the hot runner plate; a first lower molding plate disposed between the first core and the clamping plate to face the first upper molding plate; a second upper molding plate disposed between the second core and the opposite side surfaces of the hot runner plate; and a second lower molding plate disposed between the second core and the clamping plate to face the second upper molding plate.

Other objects, advantages and salient features of the present disclosure will become apparent from the following detailed description, which, taken in conjunction with the annexed drawings, discloses embodiments.

BRIEF DESCRIPTION OF THE DRAWINGS

These and/or other aspects and advantages of the present disclosure will become apparent and more readily appreciated from the following description of the embodiments, taken in conjunction with the accompanying drawings of which.

Throughout the drawings, like reference numerals will be understood to refer to like parts, components and structures.

DESCRIPTION OF EXEMPLARY EMBODIMENTS

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof. Relative spatial terms such as "upper", "lower", "up", "down", "upward", "downward", "vertical", and "horizontal" are used in the specification and the claims only to recite relations between features. These relative spatial terms do not impose limitations to the absolute orientation of the collectively embodied elements in the practice of embodiments. For example, an injection apparatus having an upper core and a lower core may be rotated such that the upper core is below or lateral to the lower core, Hereinafter, a slim injection molding apparatus according to a first embodiment of the present disclosure will be described with reference to FIGS. 3 to 6.

Figure 1:
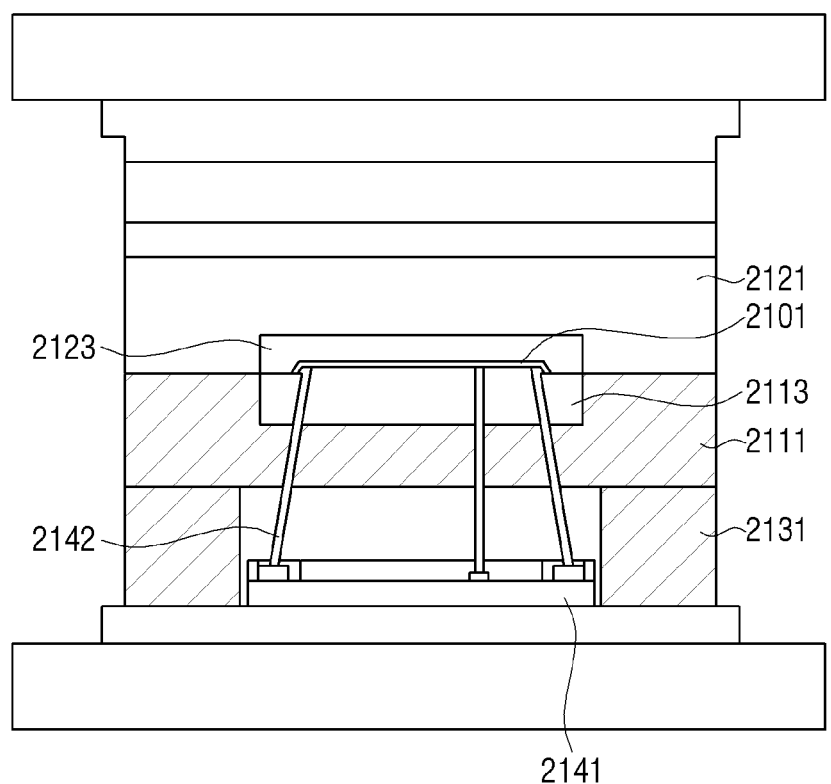
FIG. 1 is a cross-sectional view schematically illustrating a conventional injection molding apparatus.
Figure 2:
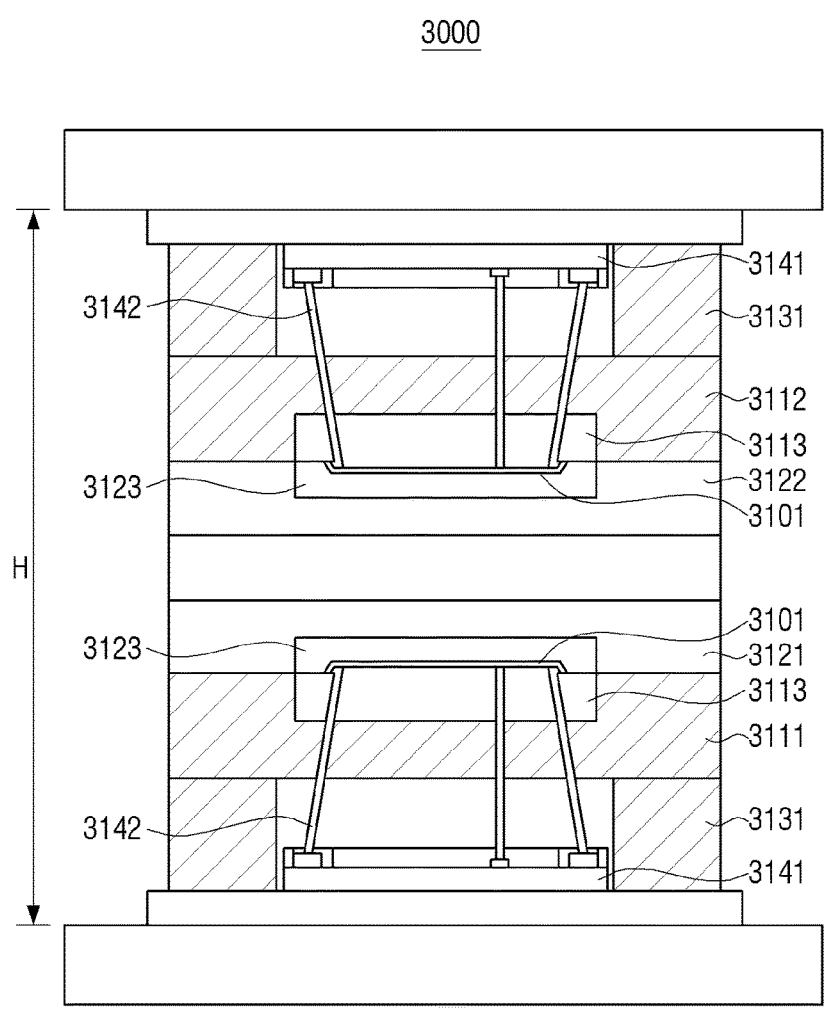
FIG. 2 is a cross-sectional view schematically illustrating a conventional tandem injection molding apparatus.
Figure 3:
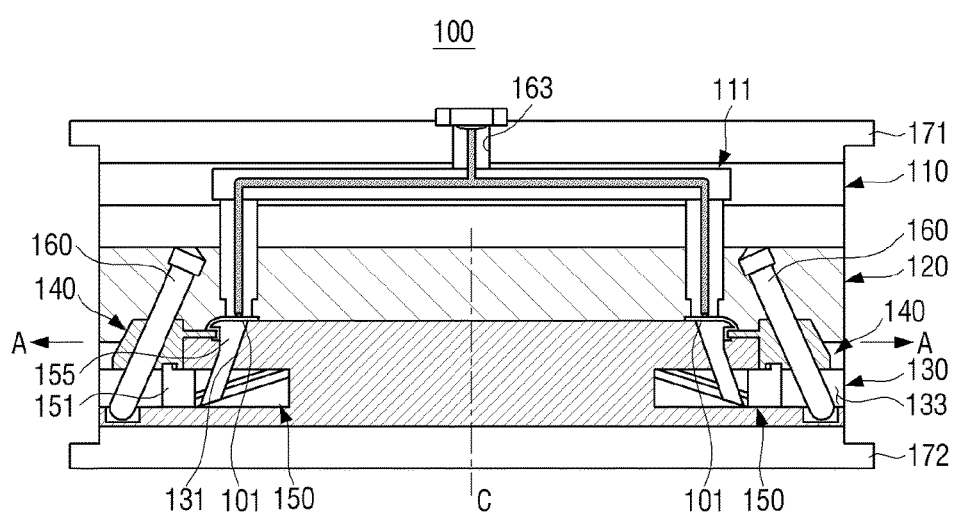
FIG. 3 is a cross-sectional view schematically illustrating a slim injection molding apparatus according to a first embodiment of the present disclosure.
Figure 4:
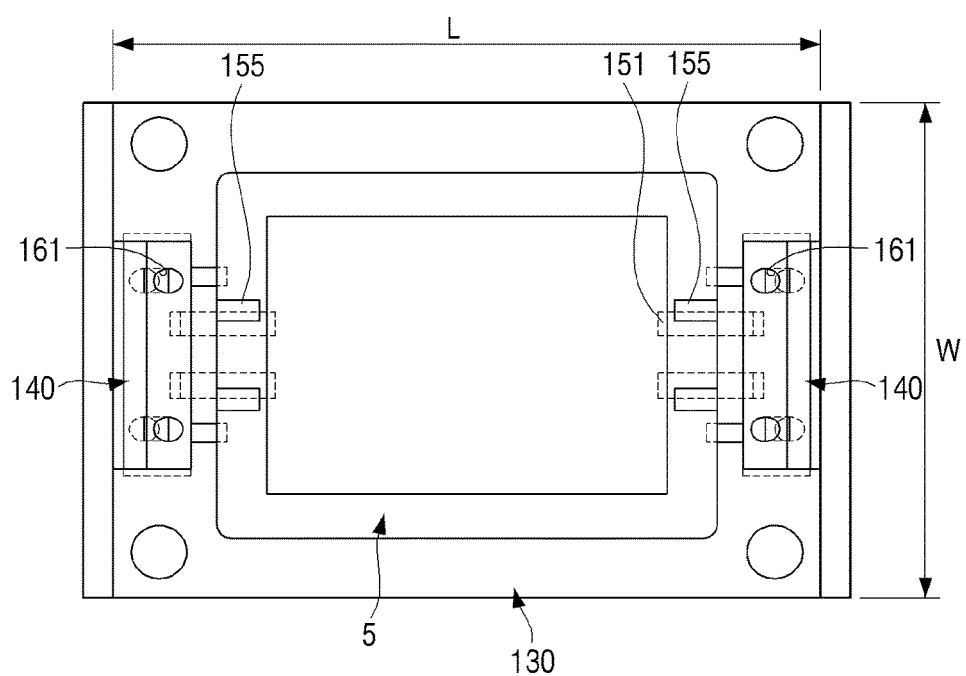
FIG. 4 is a plan view illustrating a lower core when an upper core is removed from the slim injection molding apparatus of FIG. 3.
Figure 5:
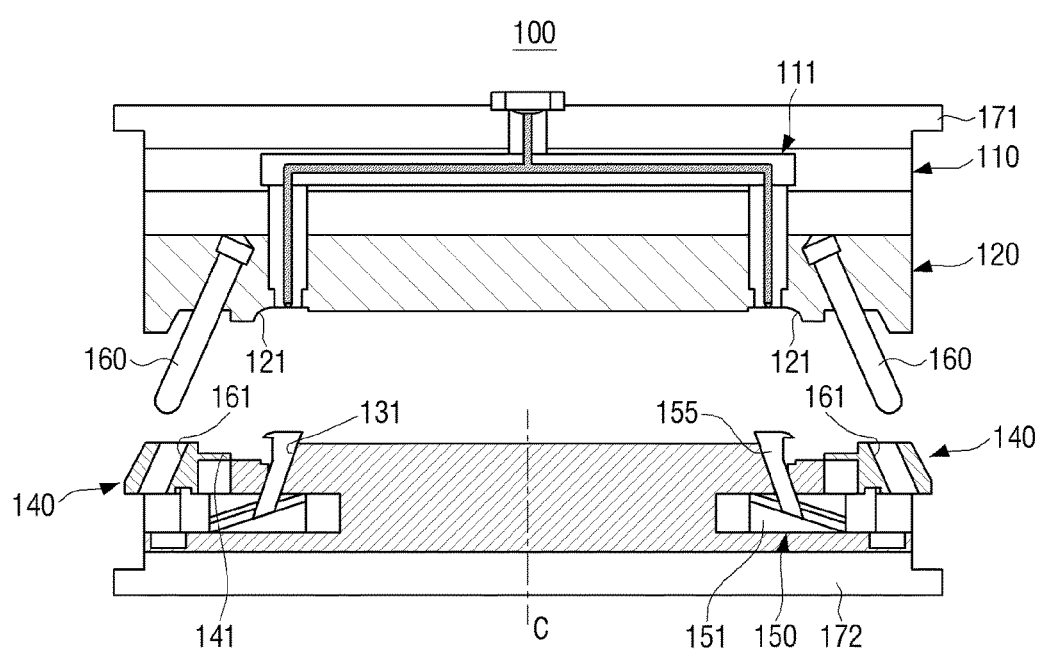
FIG. 5 is a cross-sectional view illustrating a state in which a cavity is opened by movement of an upper core in the slim injection molding apparatus of FIG. 3.
Figure 6:
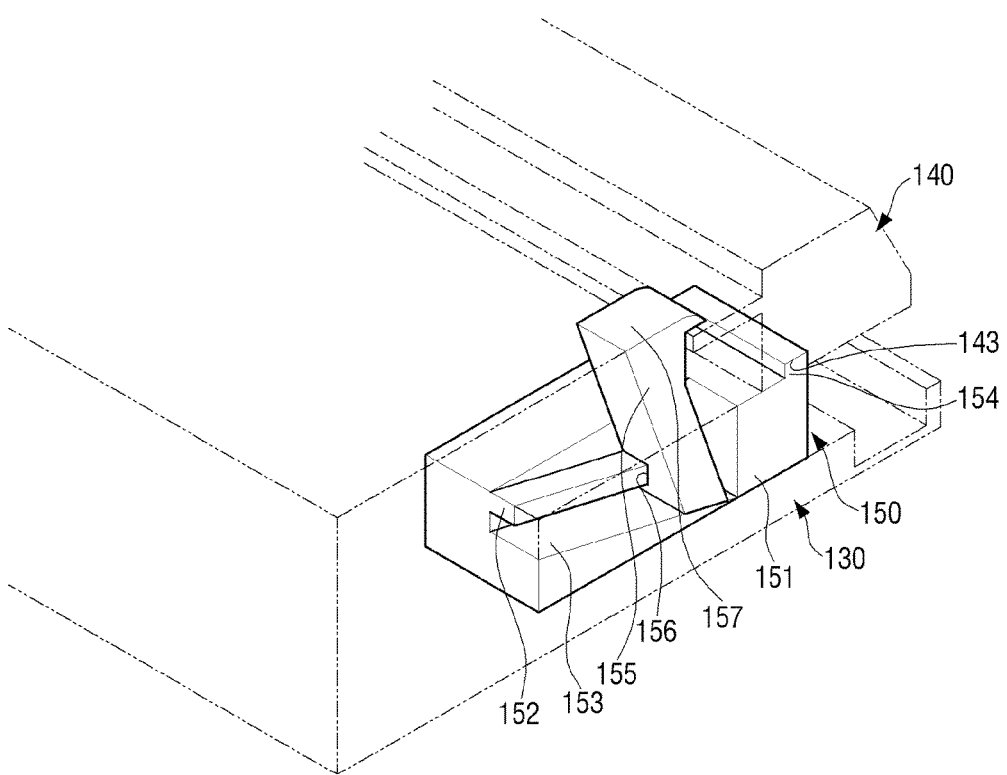
FIG. 6 is a perspective view illustrating an ejecting core used in a slim injection molding apparatus according to a first embodiment of the present disclosure.

FIG. 3 is a cross-sectional view schematically illustrating a slim injection molding apparatus according to a first embodiment of the present disclosure. FIG. 4 is a plan view illustrating a lower core when an upper core is removed from the slim injection molding apparatus of FIG. 3. FIG. 5 is a cross-sectional view illustrating a state in which a cavity is opened by movement of an upper core in the slim injection molding apparatus of FIG. 3. FIG. 6 is a perspective view illustrating an ejecting core used in a slim injection molding apparatus according to a first embodiment of the present disclosure.

Referring to FIGS. 3, 4, and 5, a slim injection molding apparatus 100 according to an embodiment of the present disclosure is disposed between a pair of clamping plates 11 provided in an injection machine 1000 (see FIG. 17) to form an injection product, and may include a hot runner plate 110, an upper core 120, a lower core 130, and an ejecting core 150.

The hot runner plate 110 may be fixed to one of the clamping plates 11 of the injection machine 1000 by an upper fixing plate 171. In other words, the upper fixing plate 171 is fixed to one of the clamping plates 11 of the injection machine 1000, and the hot runner plate 110 is fixed to the upper fixing plate 171. In the present embodiment, the hot runner plate 110 is fixed to the clamping plate 11 by the upper fixing plate 171. Alternatively, the hot runner plate 110 may be directly fixed to the clamping plate 11 without the upper fixing plate 171.

A hot runner system 111 is provided inside the hot runner plate 110. The hot runner system 111 applies heat to a flowing passage that connects the injection machine 1000 and the cavity 101 of the slim injection molding apparatus 100, thereby maintaining injection material in a liquid state for continuous injection. A conventional hot runner system may be used as the hot runner system 111; therefore, a detailed description thereof will be omitted. The upper fixing plate 171 is provided with a hot runner portion 163 in fluid communication with the hot runner system 111.

The upper core 120 is disposed on a side surface of the hot runner plate 110, namely, a surface opposite to the surface on which the upper fixing plate 171 is disposed, and is provided with a product groove 121 corresponding to the shape of a certain injection product 5 in the surface of the upper core 120.

The lower core 130 is formed to face the upper core 120, and a top surface of the lower core 130 is formed to correspond to a lower shape of the certain injection product 5. Accordingly, when the upper core 120 and the lower core 130 are coupled to each other, a cavity 101 having a shape corresponding to the shape of the certain injection product 5 is formed by the product groove 121 of the upper core 120 and the top surface of the lower core 130.

In detail, when the upper core 120 and the lower core 130 are coupled to each other, the cavity 101 corresponding to the certain injection product 5 is formed by the product groove 121 of the upper core 120 and the top surface of the lower core 130 that face each other. An inner dimension of the cavity 101 corresponds to a dimension of the injection product 5. Accordingly, when molten plastic or resin of injection material is injected to the cavity 101 via the hot runner system 111 and is cooled, the certain injection product 5 is formed. The above-described hot runner system 111 is extended to the upper core 120 to supply the cavity 101 with the injection material.

The lower core 130 may be fixed to the opposite side clamping plate 11 of the injection machine 1000 by a lower fixing plate 172. In other words, the lower fixing plate 172 is fixed to the opposite side clamping plate 11 of the injection machine 1000, and the lower core 130 is fixed to the lower fixing plate 172. In the present embodiment, the lower core 130 is fixed to the clamping plate 11 by the lower fixing plate 172. Alternatively, the lower core 130 may be directly fixed to the clamping plate 11 without the lower fixing plate 172.

The hot runner plate 110, the upper core 120, and the lower core 130 as described above are formed to have a cross-section of a rectangular shape as illustrated in FIG. 4, respectively. A length L and a width W of each of the hot runner plate 110, the upper core 120, and the lower core 130 are the same. For example, the length L of the hot runner plate 110 is the same as the length of each of the upper core 120 and the lower core 130, and the width W of the hot runner plate 110 is the same as the width of each of the upper core 120 and the lower core 130.

In the present embodiment, the upper core 120 is not disposed in the upper molding plate, but directly disposed in the hot runner plate 110 unlike the conventional injection molding apparatus. Also, the lower core 130 is not disposed in the lower molding plate, but directly disposed in the lower fixing plate 172 unlike the conventional injection molding apparatus. Accordingly, the slim injection molding apparatus 100 according to an embodiment of the present disclosure may reduce material cost and processing cost required to manufacture the upper molding plate and the lower molding plate.

The ejecting core 150 is disposed in the lower core 130, and is formed to push up the injection product 5 formed in the cavity 101 when the upper core 120 is separated from the lower core 130. In the present embodiment, the ejecting core 150 is disposed to be moved upward and downward by the horizontal movement of the slide core 140 disposed in the lower core 130.

The slide core 140 is disposed to slidably move at opposite sides of the lower core 130, and a leading end 141 of the slide core 140 is coupled to the product groove 121 of the upper core 120 and an undercut groove of the lower core 130 so as to form a portion 102 of the cavity 101. In detail, the leading end 141 of the slide core 140 may form the portion 102 of the cavity 101 corresponding to an undercut portion 5-1 of the injection product 5.

The slide core 140 is disposed to slidably move with respect to the lower core 130 and at a side of the ejecting core 150 disposed in the lower core 130. When the upper core 120 and the lower core 130 are coupled to each other, the slide core 140 is coupled between the upper core 120 and the lower core 130, thereby forming the portion 102 of the cavity 101 corresponding to the undercut 5-1 of the injection product 5. When the upper core 120 and the lower core 130 are separated from each other, the slide core 140 is slidably moved in the lower core 130 in a first direction (arrow A) away from the center C of the lower core 130.

Such a movement of the slide core 140 may be implemented by a variety of ways. In the present embodiment, a method of moving the slide core 140 by an angular pin 160 is used.

The angular pin 160 is provided in the upper core 120 outside the product groove 121 of the upper core 120. The angular pin 160 is disposed to be downwardly inclined in the first direction (arrow A) in which the slide core 140 is moved away from the center C of the lower core 130.

The slide core 140 is provided with a guide hole 161 in which the angular pin 160 is movably inserted. The guide hole 161 is also formed to be downwardly inclined with respect to the first direction (arrow A). Accordingly, as illustrated in FIG. 5, when the angular pin 160 is raised by rising of the upper core 120, the slide core 140 is moved by the angular pin 160 inserted in the guide hole 161. At this time, the slide core 140 is moved in the first direction (arrow A) away from the center C of the lower core 130 so that the leading end 141 of the slide core 140 is separated from the undercut groove of the lower core 130.

On the other hand, when the upper core 120 is lowered, the angular pin 160 is inserted into the guide hole 161 of the slide core 140. When the upper core 120 is further lowered, the slide core 140 is moved toward the center C of the lower core 130 by the angular pin 160 inserted in the guide hole 161. When the lowering of the upper core 120 is completed, the leading end 141 of the slide core 140 moved by the angular pin 160 forms the cavity 101 along with the undercut groove of the lower core 130 and the product groove 121 of the upper core 120.

In the above-description, the slide core 140 is moved by the angular pin 160 disposed in the upper core 120. However, the moving method of the slide core 140 is not limited thereto. Although not illustrated, the slide core 140 may be configured to be moved by a hydraulic cylinder or an air cylinder disposed in a side of the slide core 140.

The ejecting core 150 is disposed in the lower core 130, and is able to be moved by the slide core 140. In detail, when the upper core 120 is separated from the lower core 130, the ejecting core 150 is projected from the top surface of the lower core 130 to push up the injection product 5 formed in the cavity 101.

The ejecting core 150 is disposed to be slidably moved with respect to the lower core 130 inside the lower core 130, and is formed to be moved integrally with the slide core 140 according to the movement of the slide core 140 as described above.

In detail, Referring to FIGS. 3 to 6, the ejecting core 150 may include an ejecting body 151 and an ejecting pin 155.

The ejecting body 151 is disposed below slide core 140 and inside the lower core 130, and is formed to slidably move with respect to the lower core 130. Accordingly, the lower core 130 is provided with an ejecting groove 133 in which the ejecting body 151 is inserted and moved in a side surface of the lower core 130.

A guide rail 152 for guiding the vertical movement of the ejecting pin 155 is formed in one side surface of the ejecting body 151. The guide rail 152 is formed to project from the one side surface of the ejecting body 151. The guide rail 152 is disposed to be inclined upward toward the top surface of the lower core 130. Also, a supporting portion 153 is provided parallel to the guide rail 152 below the guide rail 152. The supporting portion 153 supports the lower end of the ejecting pin 155, and allows the ejecting pin 155 to be slidably moved along the guide rail 152.

The ejecting pin 155 is provided in the one side surface of the ejecting body 151, and when the slide core 140 is moved away from the center C of the lower core 130, the ejecting pin 155 is projected from the top surface of the lower core 130, thereby pushing up the injection product 5.

The ejecting pin 155 is provided with a guide groove 156, in which the guide rail 152 of the ejecting body 151 is inserted, in one side surface of the lower end portion of the ejecting pin 155 so that the ejecting pin 155 is disposed to slidably move with respect to the ejecting body 151. Accordingly, if the guide rail 152 is inserted in the guide grooves 156, the ejecting pin 155 can slidably move along the guide rail 152.

Also, a receiving portion 157, on which the injection product 5 is received, is provided at a top end portion of the ejecting pin 155. The receiving portion 157 is configured to form the cavity 101 along with the top surface of the lower core 130. In other words, the receiving portion 157 of the ejecting pin 155 forms a portion of the top surface of the lower core 130. Accordingly, the receiving portion 157 of the ejecting pin 155 forms the cavity 101 along with the product groove 121 of the upper core 120, the top surface of the lower core 130, and the leading end 141 of the slide core 140.

On the other hand, the lower core 130 is provided with an ejecting hole 131 in which the ejecting pin 155 is inserted and moved upward and downward. The ejecting hole 131 is formed such that when the ejecting pin 155 is moved by the guide rail 152 of the ejecting body 151, the ejecting pin 155 can move upward and downward with respect to the lower core 130. The ejecting hole 131 may be formed perpendicular to the bottom surface of the lower core 130, or to have a predetermined inclination with respect to the bottom surface of the lower core 130.

Accordingly, when the ejecting pin 155 is located at the highest position 152a of the guide rail 152, the ejecting pin 155 is projected from the top surface of the lower core 130 through the ejecting hole 131 of the lower core 130. When the ejecting pin 155 is located at the lowest position 152b, the ejecting pin 155 is lowered through the ejecting hole 131 so that the receiving portion 157 of the ejecting pin 155 is matched with the top surface of the lower core 130 so as to form the cavity 101. When the ejecting pin 155 is projected from the top surface of the lower core 130, the receiving portion 157 of the ejecting pin 155 pushes up the injection product 5 formed in the cavity 101, thereby separating the injection product 5 from the lower core 130.

The ejecting core 150 is provided with a connection protrusion 154 formed on the top surface of the ejecting body 151 and the slide core 140 is provided with a connection groove 143, in which the connection protrusion 154 of the ejecting core 150 is inserted, in the bottom surface of the slide core 140 that is in contact with the ejecting core 150 so that the ejecting core 150 can be moved integrally with the slide core 140. Because the ejecting core 150 is connected to the slide core 140 by the connection protrusion 154, when the slide core 140 slidably moves with respect to the lower core 130, the ejecting core 150 also is slidably moved with respect to the lower core 130.

In the above-description and FIG. 6, the ejecting core 150 has a single ejecting pin 155 provided in the one side surface of the ejecting body 151. However, if the size of the injection product 5 is large, two ejecting pins 155 may be disposed symmetrically in opposite side surfaces of the ejecting body 151.

Hereinafter, operation of the slim injection molding apparatus 100 according to a first embodiment of the present disclosure having the structure as described above will be described with reference to FIGS. 7, 8, and 9.

Figure 7:
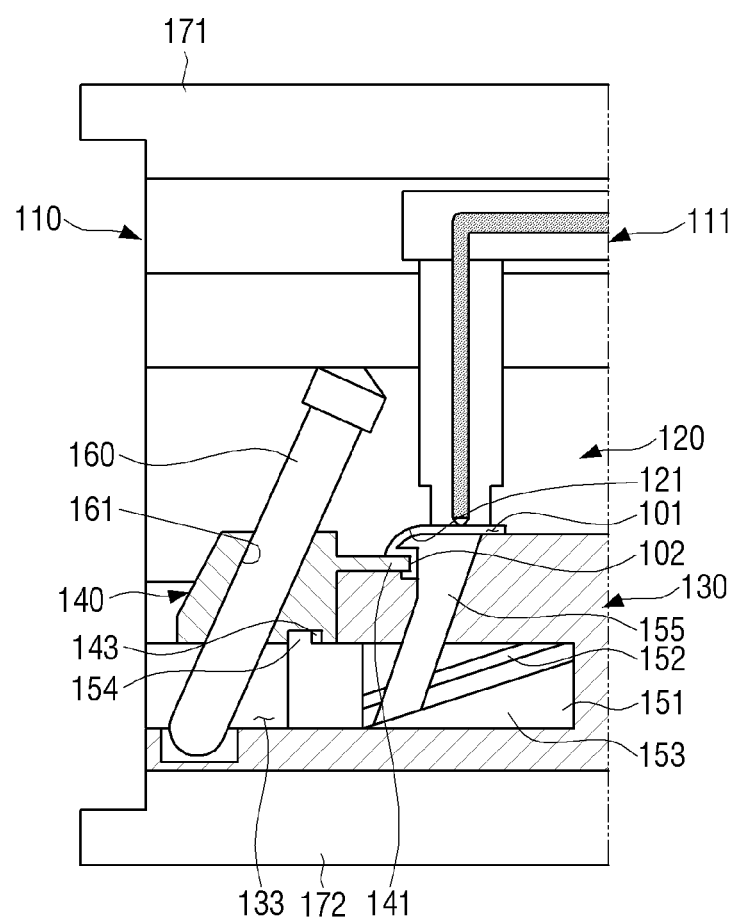
FIG. 7 is a partial cross-sectional view illustrating a state in which an upper core, a lower core, and a slide core of a slim injection molding apparatus according to a first embodiment of the present disclosure are coupled to each other.
Figure 8:
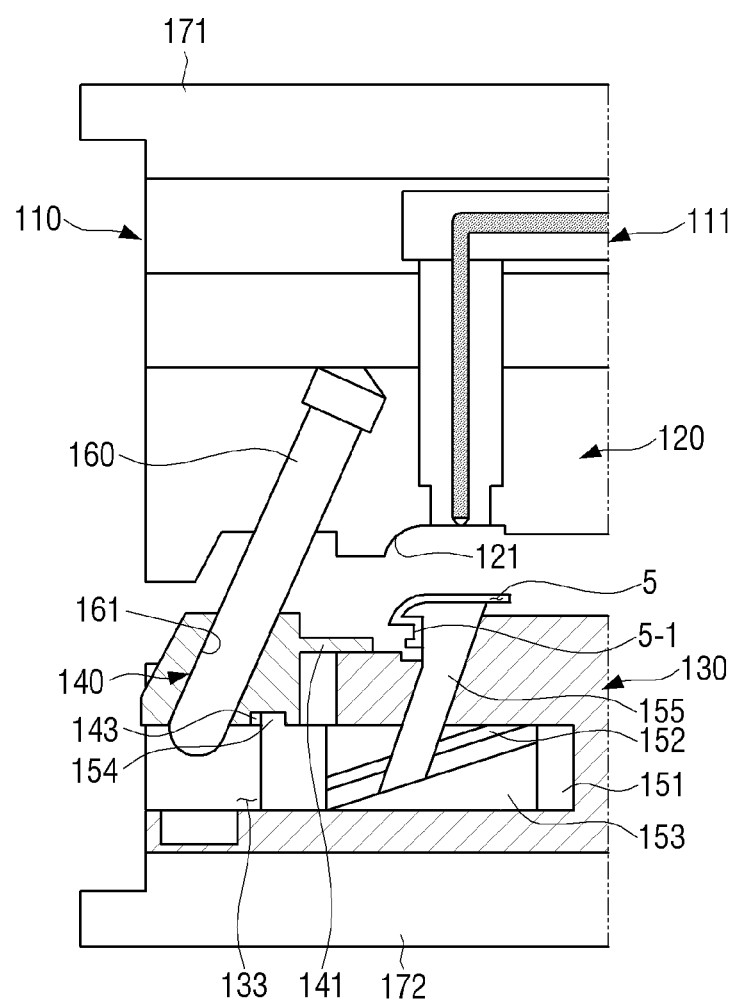
FIG. 8 is a partial cross-sectional view illustrating a state in which the upper core is being separated from the slim injection molding apparatus of FIG. 7.
Figure 9:
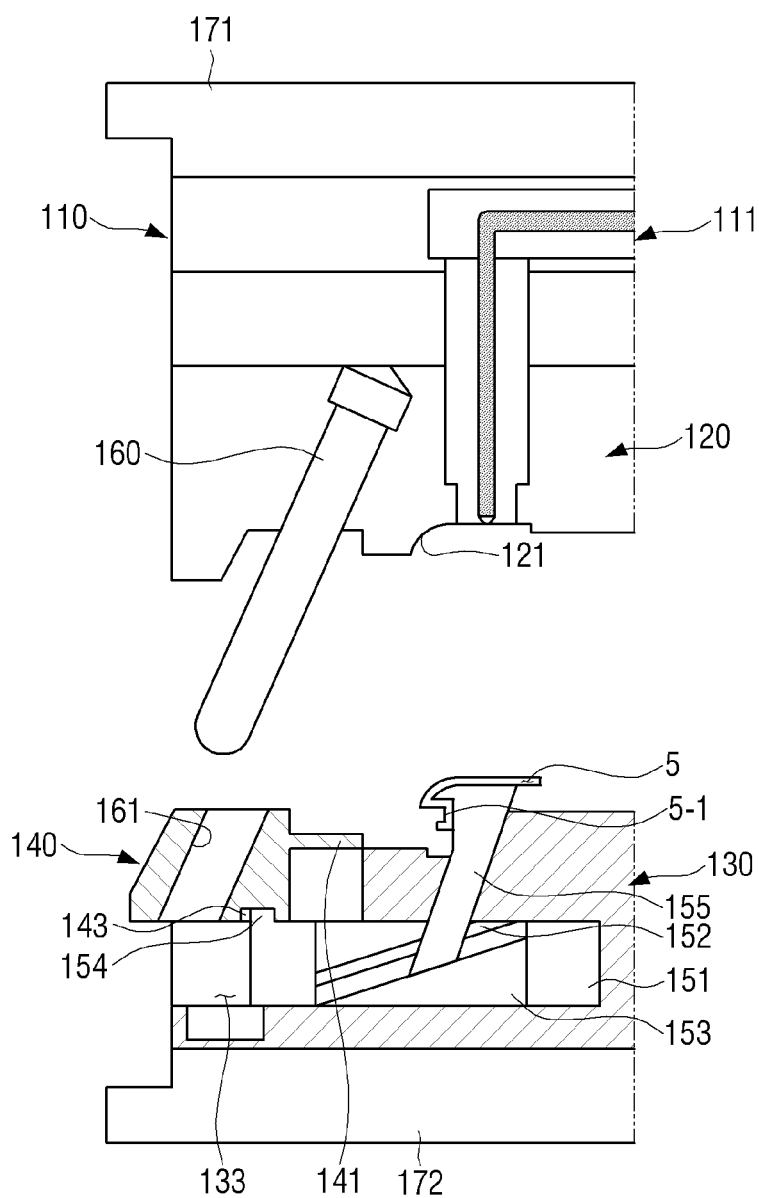
FIG. 9 is a partial cross-sectional view illustrating a state in which the upper core is completely separated from the lower core and the slide core in the slim injection molding apparatus of FIG. 7.

FIG. 7 is a partial cross-sectional view illustrating a state in which an upper core, a lower core, and a slide core of a slim injection molding apparatus according to a first embodiment of the present disclosure are coupled to each other. FIG. 8 is a partial cross-sectional view illustrating a state in which the upper core is being separated from the slim injection molding apparatus of FIG. 7. FIG. 9 is a partial cross-sectional view illustrating a state in which the upper core is completely separated from the lower core and the slide core in the slim injection molding apparatus of FIG. 7.

Referring to FIG. 7, the upper core 120, the lower core 130, the slide core 140, and the ejecting core 150 form the cavity 101 corresponding to the injection product 5 to be manufactured. In this state, the injection machine 1000 (see FIG. 17) performs an injection operation to inject molten plastic or resin of the injection material into the cavity 101 via the hot runner system 111.

After the injection of the molten plastic or resin into the cavity 101 is completed and a certain cooling time elapses, the upper core 120 is moved so that the injection product 5 is ejected from the cavity 101.

In detail, as illustrated in FIG. 8, as the upper core 120 starts to be separated from the lower core 130, the angular pin 160 provided in the upper core 120 also begins to rise integrally with the upper core 120. When the angular pin 160 rises, the slide core 140 is moved in the first direction (arrow A) away from the center C of the lower core 130 by the angular pin 160 inserted into the guide hole 161.

As the slide core 140 starts to move in the first direction (arrow A), the ejecting body 151 of the ejecting core 150 disposed below the slide core 140 also begins to move in the first direction (arrow A) integrally with the slide core 140. As the ejecting body 151 of the ejecting core 150 starts to move in the first direction (arrow A), the ejecting pin 155 begins to be raised by the guide rail 152 formed in the ejecting body 151. As the ejecting pin 155 starts to rise, the receiving portion 157 of the ejecting pin 155 begins to be projected from the top surface of the lower core 130.

As illustrated in FIG. 9, when the upper core 120 is fully raised, the slide core 140 is moved in the first direction (arrow A) so that the leading end 141 of the slide core 140 is completely separated from the undercut groove of the lower core 130. At this time, because the ejecting body 151 disposed below the slide core 140 also is moved maximally in the first direction (arrow A), the ejecting pin 155 is located at the highest position 152a of the guide rail 152 of the ejecting body 151. Thus, the ejecting pin 155 is projected through the ejecting hole 131 of the lower core 130, thereby separating the injection product 5 from the lower core 130. At this time, the injection product 5 is separated from the lower core 130 in a state of being received on the receiving portion 157 of the ejecting pin 155.

As described above, because the slim injection molding apparatus 100 according to an embodiment of the present disclosure ejects the injection product 5 using the slide core 140 to form the cavity 101, the separate spacer block 2131 or the pushing plate 2141, which is disposed outside of the lower molding plate 2111 and is used in the conventional injection molding apparatus 2000, is not required to use. Therefore, the height h and size of the slim injection molding apparatus may be reduced.

In the above description, the upper core 120 is moved upward and downward; however, movement of the upper core 120 is not limited thereto. According to a way in which the injection molding apparatus 100 is disposed in the injection machine, one of the upper core 120 and the lower core 130 may be moved in a horizontal direction so that the upper core is separated from or coupled to the lower core 130.

Hereinafter, a slim injection molding apparatus 200 according to a second embodiment of the present disclosure will be described with reference to FIGS. 10 to 15.

Figure 10:
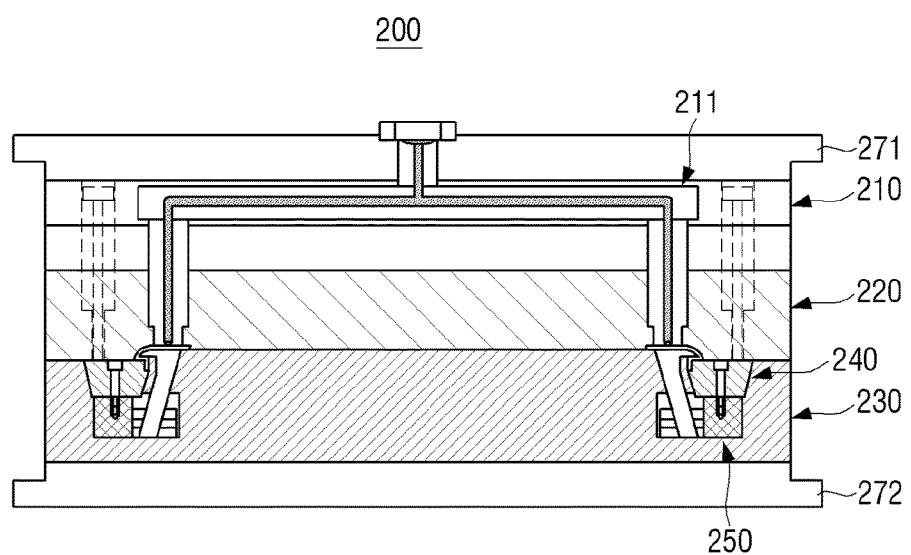
FIG. 10 is a cross-sectional view schematically illustrating a slim injection molding apparatus according to a second embodiment of the present disclosure.
Figure 11:
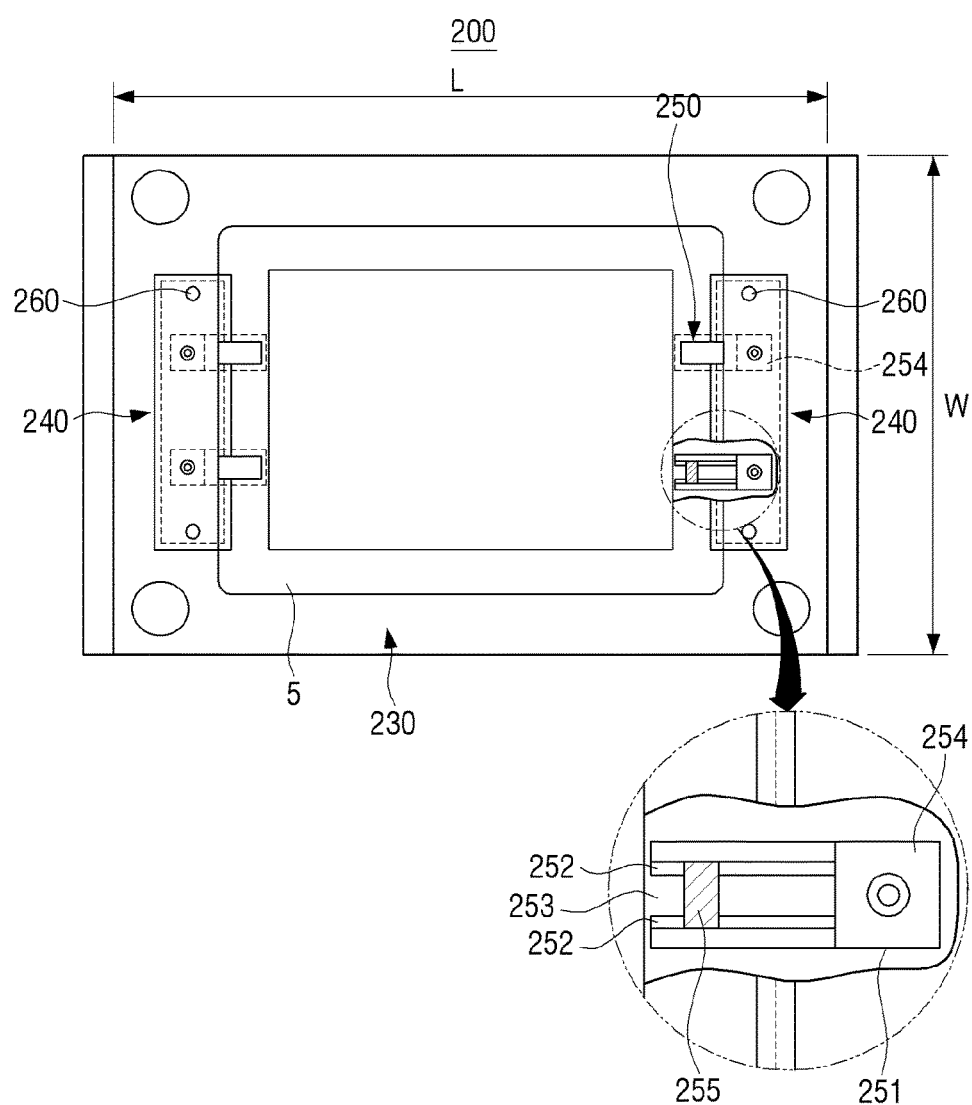
FIG. 11 is a plan view illustrating a lower core when an upper core is removed from the slim injection molding apparatus of FIG. 10.
Figure 12:
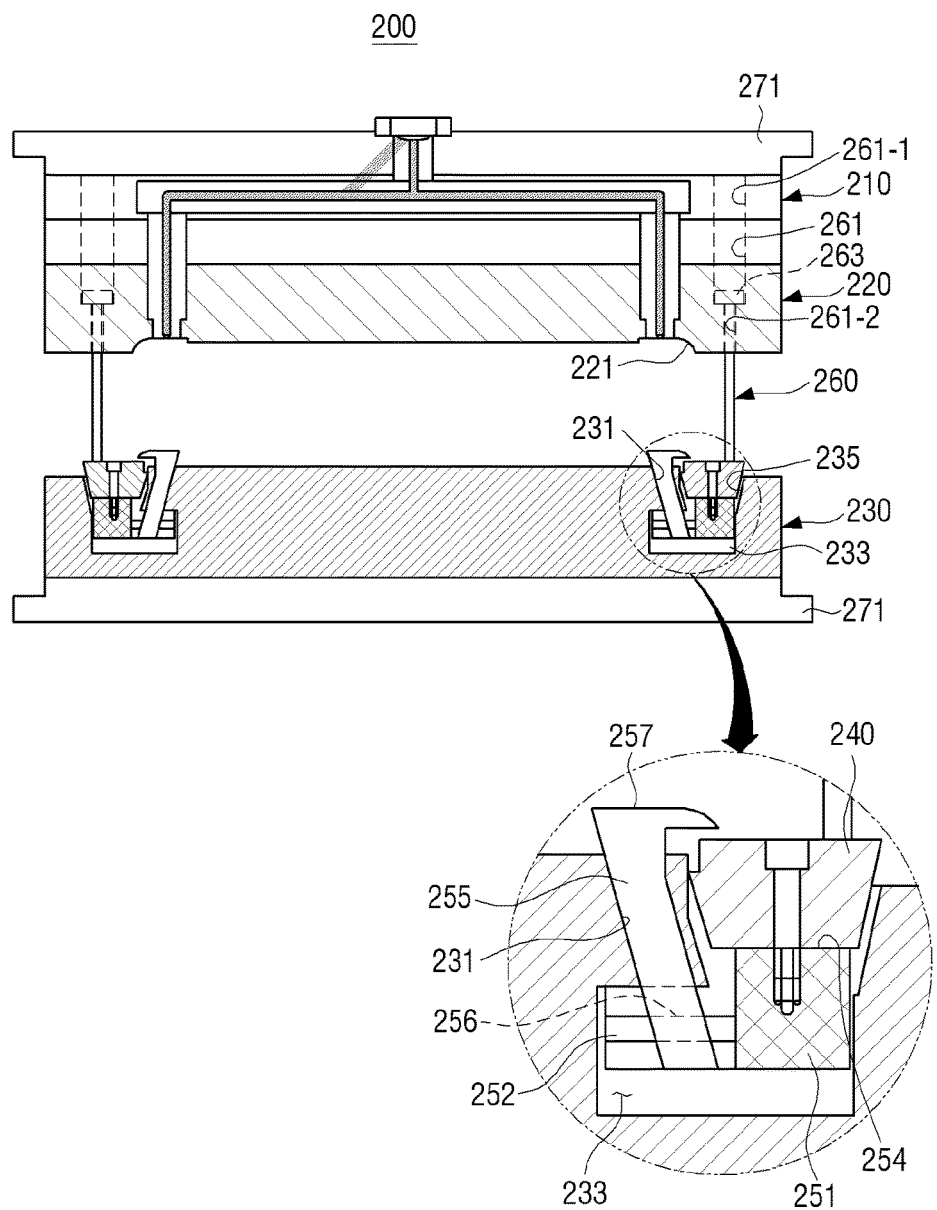
FIG. 12 is a cross-sectional view illustrating a state in which a cavity is opened by movement of an upper core in the slim injection molding apparatus of FIG. 10.

FIG. 10 is a cross-sectional view schematically illustrating a slim injection molding apparatus according to a second embodiment of the present disclosure. FIG. 11 is a plan view illustrating a lower core when an upper core is removed from the slim injection molding apparatus of FIG. 10. FIG. 12 is a cross-sectional view illustrating a state in which an upper core is moved and a cavity is open in the slim injection molding apparatus of FIG. 10.

Referring to FIGS. 10 to 12, a slim injection molding apparatus 200 according to an embodiment of the present disclosure is disposed between the pair of clamping plates 11 provided in the injection machine 1000 (see FIG. 17) to form an injection product, and may include a hot runner plate 210, an upper core 220, a lower core 230, and an ejecting core 250.

A hot runner system 211 is provided inside the hot runner plate 210. The hot runner plate 210 is similar to or the same as the hot runner plate 110 according to the first embodiment; therefore, description of the same parts will be omitted.

The upper core 220 is disposed in one side surface of the hot runner plate 210, and is provided with a product groove 221 corresponding to the shape of a certain injection product 5 in the surface of the upper core 220.

The lower core 230 is formed to face the upper core 220, and a top surface of the lower core 230 is formed to correspond to a lower shape of the certain injection product 5. Accordingly, when the upper core 220 and the lower core 230 are coupled to each other, a cavity 201 having a shape corresponding to the shape of the certain injection product 5 is formed by the product groove 221 of the upper core 220 and the top surface of the lower core 230.

In detail, when the upper core 220 and the lower core 230 are coupled to each other, the cavity 201 corresponding to the certain injection product 5 is formed by the product groove 221 of the upper core 220 and the top surface of the lower core 230 that face each other. An inner dimension of the cavity 201 corresponds to the dimension of the injection product 5. Accordingly, when molten plastic or resin of injection material is injected into the cavity 201 via the hot runner system 211 and is cooled, the certain injection product 5 is formed. The above-described hot runner system 211 is extended to the upper core 220 to supply the injection material to the product groove 221 of the upper core 220.

The lower core 230 may be fixed to the opposite side clamping plate 11 of the injection machine 1000 by a lower fixing plate 272. In other words, the lower fixing plate 272 is fixed to the opposite side clamping plate 11 of the injection machine 1000, and the lower core 230 is fixed to the lower fixing plate 172. In the present embodiment, the lower core 230 is fixed to the clamping plate 11 by the lower fixing plate 272. Alternatively, the lower core 230 may be directly fixed to the clamping plate 11 without the lower fixing plate 272.

The hot runner plate 210, the upper core 220, and the lower core 230 as described above are formed to have a cross-section of a rectangular shape, respectively. A length L and a width W of each of the hot runner plate 210, the upper core 220, and the lower core 230 are the same. For example, the length L of the hot runner plate 210 is the same as the length of each of the upper core 220 and the lower core 230, and the width W of the hot runner plate 210 is the same as the width of each of the upper core 220 and the lower core 230.

In other words, in the present embodiment, the upper core 220 is not disposed in the upper molding plate, but directly disposed in the hot runner plate 210 unlike the conventional injection molding apparatus. Also, the lower core 230 is not disposed in the lower molding plate, but directly disposed in the lower fixing plate 272 unlike the conventional injection molding apparatus. Accordingly, the slim injection molding apparatus 200 according to an embodiment of the present disclosure may reduce material cost and processing cost required to manufacture the upper molding plate and the lower molding plate.

The ejecting core 250 is disposed in the lower core 230, and is formed to push up the injection product 5 formed in the cavity 201 when the upper core 220 is separated from the lower core 230. In the present embodiment, the ejecting core 250 is disposed to be moved upward and downward by the vertical movement of an ejector block 240 disposed in the lower core 230.

The ejector block 240 is disposed to vertically move in an ejector groove 235 formed in the top surface of the lower core 230. The top surface of the ejector block 240 forms a portion of the top surface of the lower core 230 so that the ejector block 240 forms a portion of the cavity 101 along with the lower core 230.

The ejector block 240 is connected to the upper core 220 by a lift member 260. The lift member 260 is formed in a rod shape, and is disposed to vertically move in the upper core 220. In detail, the lift member 260 is inserted in and is slidably moved with respect to a lift hole 261 provided in the upper core 220. The lift hole 261 is divided into a large diameter portion 261-1 with a large inner diameter and a small diameter portion 261-2 with a small inner diameter. The large diameter portion 261-1 of the lift hole 261 is formed so that a stopper 263 provided in an end of the lift member 260 passes through the large diameter portion 261-1. The small diameter portion 261-2 of the lift hole 261 is formed to allow the lift member 260 to pass through and to prevent the stopper 263 from passing through the small diameter portion 261-2. The large diameter portion 261-1 of the lift member 260 may extend through the hot runner plate 210. The ejector block 240 is connected to the other end of the lift member 260, in detail, an end of the lift member 260 opposite to the one end with the stopper 263. Accordingly, movement of the upper core 220 is transmitted to the ejector block 240 by the lift member 260 so that when the upper core 220 is raised, the ejector block 240 is lifted by the lift member 260. At least two lift members 260 and at least two lift holes 261 may be provided.

The ejecting core 250 is disposed in the lower core 230, and is able to be vertically moved by the ejector block 240. In detail, when the upper core 220 is separated from the lower core 230, the ejecting core 250 is projected from the top surface of the lower core 230 and pushes up the injection product 5 formed in the cavity 201.

The ejecting core 250 is disposed in a accommodating space 233 provided below the ejector groove 235 inside the lower core 230, and is vertically moved with respect to the lower core 230. The ejecting core 250 is vertically moved integrally with the ejector block 240 according to the movement of the ejector block 240.

In detail, referring to FIGS. 10 to 12, the ejecting core 250 may include an ejecting body 251 and an ejecting pin 255.

The ejecting body 251 is disposed in the accommodating space 233 provided below the ejector groove 235 of the lower core 230, and is formed to be slidably moved in a direction perpendicular to the lower core 230. A fixing portion 254 provided in the top surface of the ejecting body 251 is coupled to the ejector block 240 by a bolt or a screw.

A slot 253 is provided in a middle portion of a side of the fixing portion 254 of the ejecting body 251. A guide rail 252 for guiding horizontal movement of the ejecting pin 255 with respect to the ejecting body 251 is provided on each of opposite inner surfaces of the slot 253. The guide rail 152 projects from each of the opposite inner surfaces of the slot 253 of the ejecting body 251, and is formed parallel to the bottom surface of the lower core 230.

The ejecting pin 255 is disposed at one side of the ejector block 240, and is formed such that as the ejector block 240 is lifted, the ejecting pin 255 is projected from the top surface of the lower core 230 and pushes up the injection product 5 formed in the cavity 201.

The ejecting pin 255 is provided with a pair of guide grooves 256, in which the pair of guide rails 252 of the ejecting body 251 are inserted, in opposite side surfaces of a lower portion of the ejecting pin 255 so that, when the ejecting body 251 is lifted or lowered by the ejector block 240, the ejecting pin 255 is slidably moved with respect to the ejecting body 251. Accordingly, if the pair of guide rails 252 provided in the slot 253 of the ejecting body 251 are inserted in the pair of guide grooves 256 of the ejecting pin 255, the ejecting pin 255 can slidably move along the pair of the guide rails 252.

Also, the ejecting pin 255 is provided with a receiving portion 257 on which the injection product 5 is received at an upper end of the ejecting pin 255. The receiving portion 257 is configured to form the cavity 201 along with the top surface of the lower core 230. In other words, the receiving portion 257 of the ejecting pin 255 forms a portion of the top surface of the lower core 230. Accordingly, the receiving portion 257 of the ejecting pin 255 forms the cavity 201 along with the product groove 221 of the upper core 220, the top surface of the lower core 230, and a portion of the ejector block 240.

On the other hand, the lower core 230 is provided with an ejecting hole 231 in which the ejecting pin 255 is inserted and is moved upward and downward. The ejecting hole 231 is formed such that when the ejecting body 251 is moved upward and downward by the ejector block 240, the ejecting pin 255 is moved upward and downward with respect to the lower core 230 through the ejecting hole 231. The ejecting hole 231 may be formed perpendicular to or to have a predetermined slope with respect to the bottom surface of the lower core 230. In the present embodiment, the ejecting hole 231 is formed to have a predetermined slope with respect to the bottom surface of the lower core 230.

Accordingly, when the ejector block 240 is lifted, the ejecting pin 255 is projected from the top surface of the lower core 230 through the ejecting hole 231 of the lower core 230. When the ejecting body 251 is placed on the bottom of the accommodating space 233 by the lowering of the ejector block 240, the ejecting pin 255 is lowered through the ejecting hole 231 and the receiving portion 157 of the ejecting pin 255 is aligned with the top surface of the lower core 230, thereby forming the cavity 201. When the ejecting pin 255 is projected from the top surface of the lower core 230, the receiving portion 257 of the ejecting pin 255 pushes up the injection product 5 formed in the cavity 201 so that the injection product 5 is separated from the lower core 230.

Also, the ejecting body 251 of the ejecting core 250 is integrally connected to ejector block 240, and the ejector block 240 is connected to the upper core 220 by the lift member 260 so that the ejecting core 250 is lifted according as the upper core 220 is lifted, and the ejecting core 250 is lowered according as the upper core 220 is lowered.

Hereinafter, operation of the slim injection molding apparatus 200 according to a second embodiment of the present disclosure having the structure as described above will be described with reference to FIGS. 13 to 15.

Figure 13:
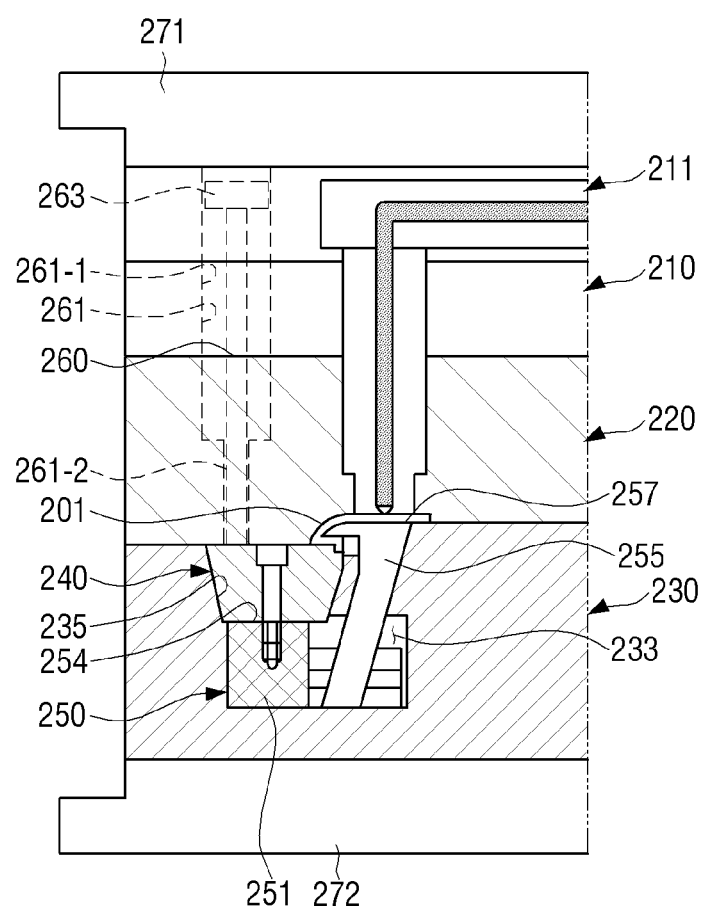
FIG. 13 is a partial cross-sectional view illustrating a state in which an upper core, a lower core, and an ejector block of a slim injection molding apparatus according to a second embodiment of the present disclosure are coupled to each other.
Figure 14:
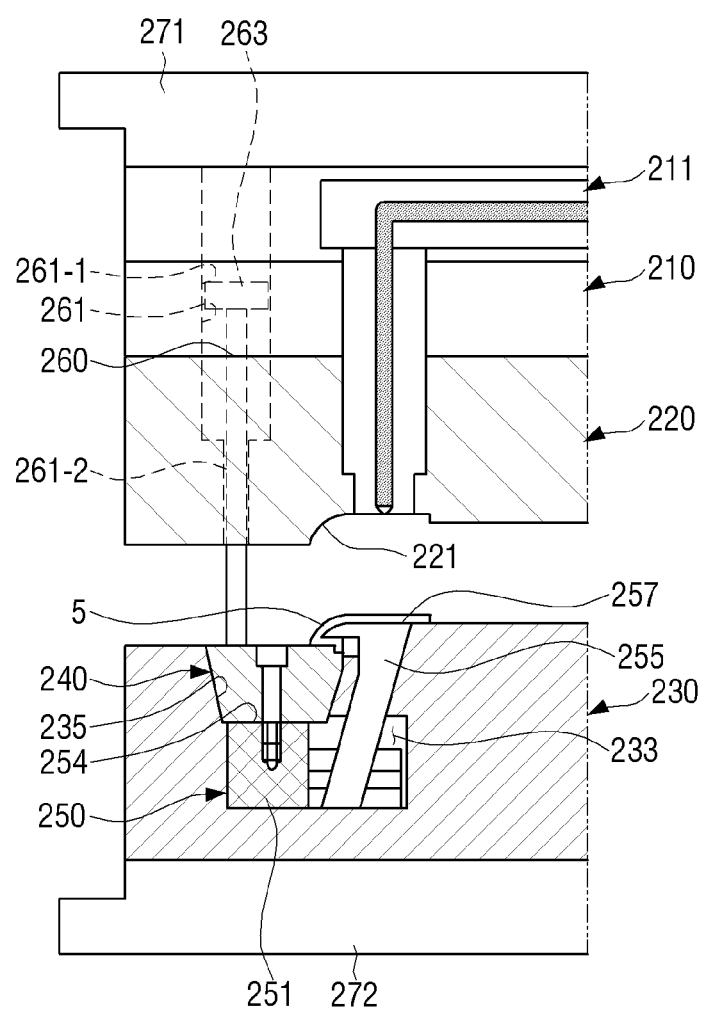
FIG. 14 is a partial cross-sectional view illustrating a state in which the upper core is being separated from the slim injection molding apparatus of FIG. 13.
Figure 15:
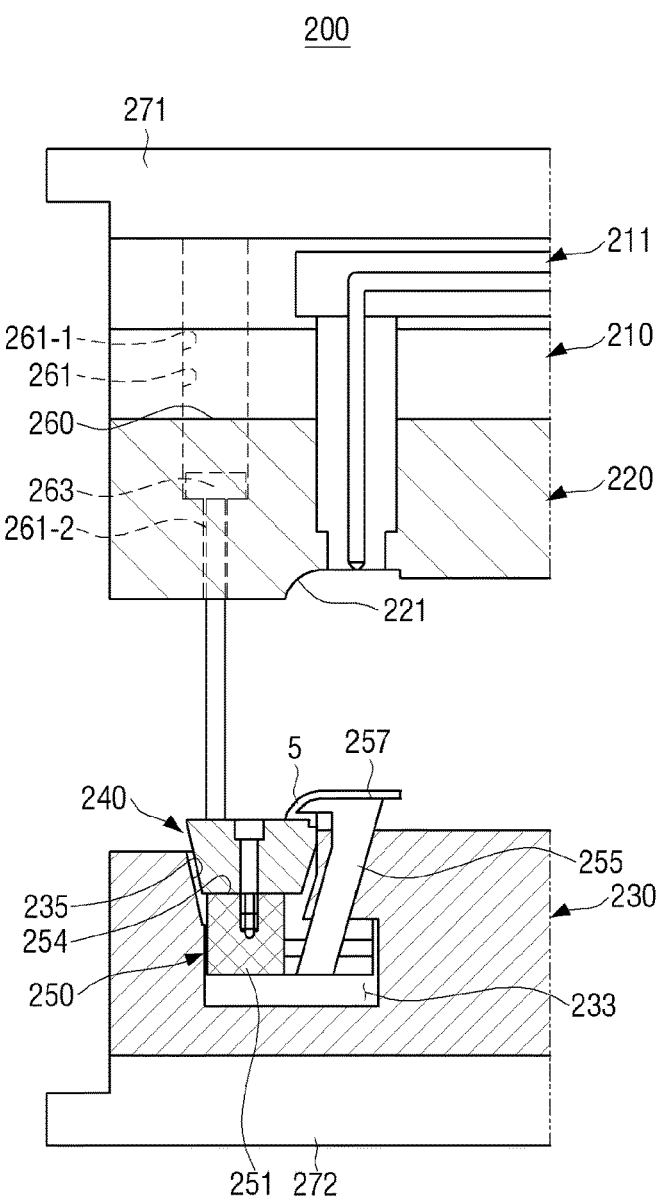
FIG. 15 is a partial cross-sectional view illustrating a state in which the upper core is completely separated from the lower core and the ejector block in the slim injection molding apparatus of FIG. 13.

FIG. 13 is a partial cross-sectional view illustrating a state in which an upper core, a lower core, and an ejector block of a slim injection molding apparatus according to a second embodiment of the present disclosure are coupled to each other. FIG. 14 is a partial cross-sectional view illustrating a state in which the upper core is being separated from the slim injection molding apparatus of FIG. 13. FIG. 15 is a partial cross-sectional view illustrating a state in which the upper core is completely separated from the lower core and the ejector block in the slim injection molding apparatus of FIG. 13.

Referring to FIG. 13, the upper core 220, the lower core 230, the ejector block 240, and the ejecting core 250 form the cavity 201 corresponding to the injection product 5 to be manufactured. In this state, the injection machine 1000 (see FIG. 17) performs an injection operation to inject molten plastic or resin of the injection material into the cavity 201 via the hot runner system 211.

After the injection of the molten plastic or resin into the cavity 201 is completed and a certain cooling time elapses, the upper core 220 is moved so that the injection product 5 is ejected from the cavity 201.

In detail, as illustrated in FIG. 14, as the upper core 220 starts to be separated from the lower core 230, the lift member 260 provided in the upper core 220 also begins to rise integrally with the upper core 220. When the lift member 260 rises, the ejector block 240 connected to one end of the lift member 260 is lifted.

As the ejector block 240 is lifted, the ejecting body 251 of the ejecting core 250 connected to the bottom surface of the ejector block 240 also begins to be lifted integrally with the ejector block 240. As the ejecting body 251 of the ejecting core 250 starts to be moved upward, the ejecting pin 255 begins to be raised by the ejecting body 251. When the ejecting pin 255 starts to rise, the receiving portion 157 of the ejecting pin 255 begins to be projected from the top surface of the lower core 230.

As illustrated in FIG. 9, when the upper core 220 is completely lifted, the ejector block 240 is maximally moved upward. At this time, because the ejecting body 251 disposed on the bottom surface of the ejector block 240 also is maximally moved upward, the ejecting pin 255 disposed in the ejecting body 251 is projected through the ejecting hole 231 of the lower core 230 to separate the injection product 5 from the lower core 230. At this time, the injection product 5 is separated from the lower core 230 in a state of being received on the receiving portion 257 of the ejecting pin 255.

As the upper core 220 is lowered after the ejection of the injection product 5 is completed, the ejector block 240 is lowered by the lift member 260. Because the ejecting body 251 connected to the ejector block 240 is lowered by the lowering of the ejector block 240, the ejecting pin 255 disposed in the ejecting body 251 is lowered so as to form the cavity 201 along with the upper core 220 and the lower core 230 as illustrated in FIG. 13.

As described above, because the slim injection molding apparatus 200 according to an embodiment of the present disclosure ejects the injection product 5 using the ejector block 240 to form the cavity 201, the separate spacer block 2131 or the pushing plate 2141 which is disposed outside of the lower molding plate 2111 is not required to use unlike the conventional injection molding apparatus 2000. Therefore, the low height of the slim injection molding apparatus 1 may be implemented.

In the above description, the upper core 220 is moved upward and downward; however, movement of the upper core 220 is not limited thereto. According to a way in which the injection molding apparatus 200 is disposed in the injection machine, one of the upper core 220 and the lower core 230 may be moved in a horizontal direction so that the upper core 220 is separated from or coupled to the lower core 230.

Hereinafter, a slim injection molding apparatus 300 according to a third embodiment of the present disclosure will be described with reference to FIGS. 16 to 19.

Figure 16:
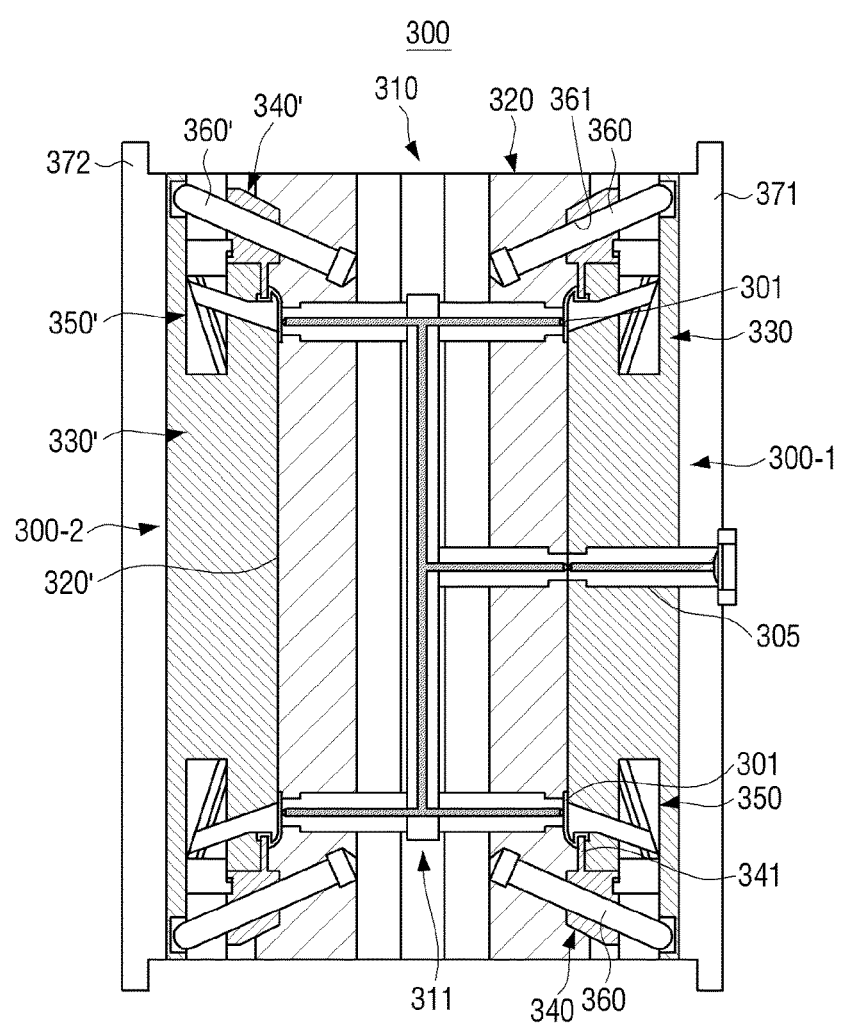
FIG. 16 is a cross-sectional view schematically illustrating a slim injection molding apparatus according to a third embodiment of the present disclosure.
Figure 17:
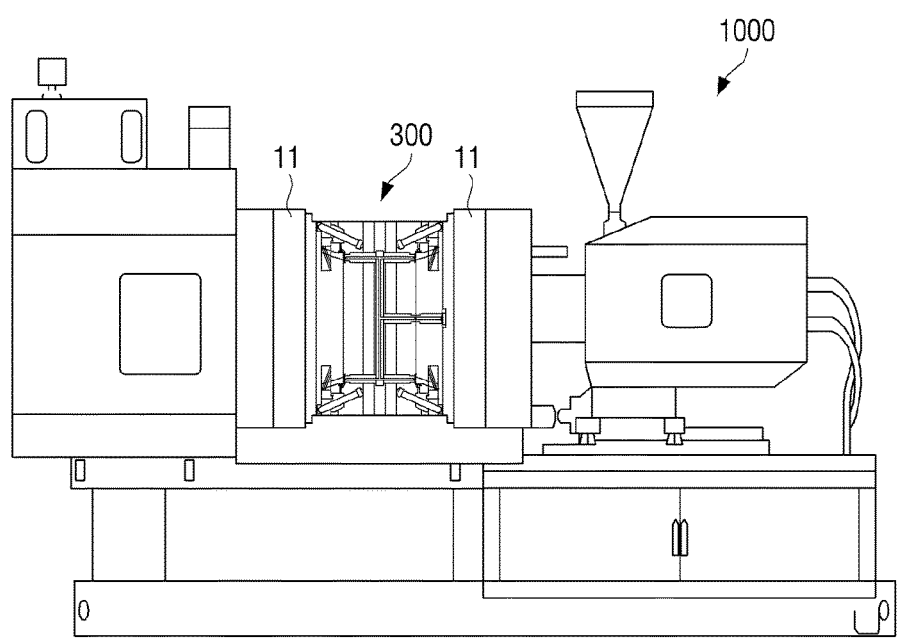
FIG. 17 is a view illustrating an injection machine in which a slim injection molding apparatus according to an embodiment of the present disclosure is disposed.
Figure 18:
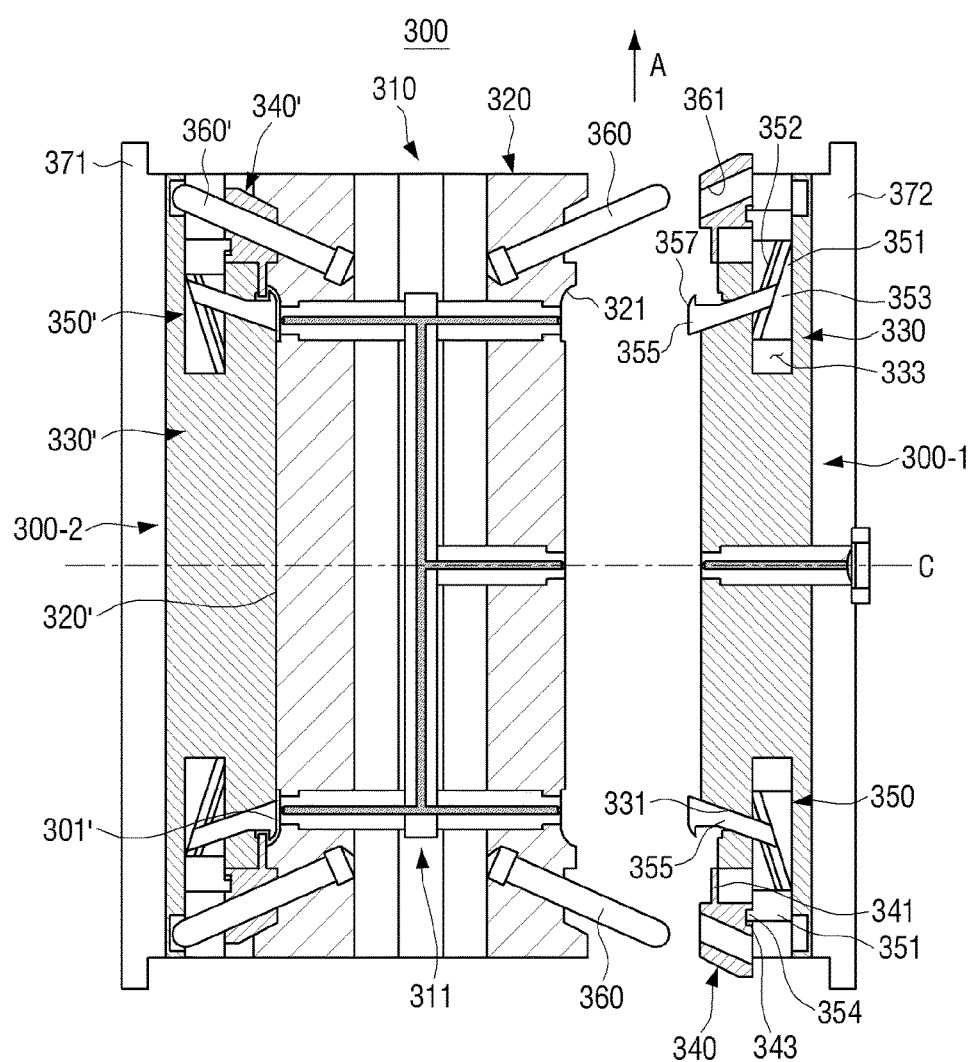
FIG. 18 is a cross-sectional view illustrating a state in which a first cavity is opened by movement of a lower core of a first core in the slim injection molding apparatus of FIG. 16.
Figure 19:
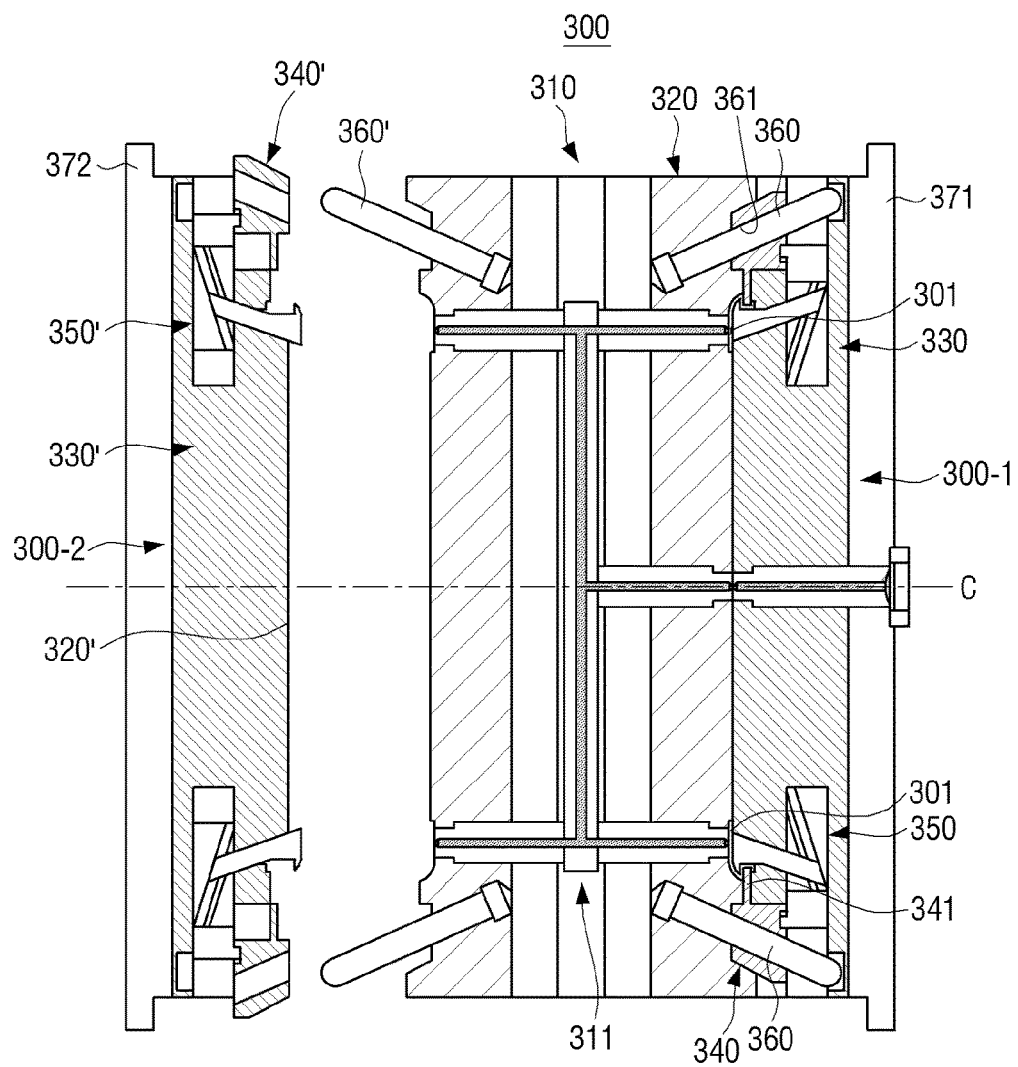
FIG. 19 is a cross-sectional view illustrating a state in which a second cavity is opened by movement of a lower core of a second core in the slim injection molding apparatus of FIG. 16.

FIG. 16 is a cross-sectional view schematically illustrating a slim injection molding apparatus according to a third embodiment of the present disclosure. FIG. 17 is a view illustrating an injection machine in which the slim injection molding apparatus of FIG. 16 is disposed. FIG. 18 is a cross-sectional view illustrating a state in which a lower core of a first core is moved and a first cavity is open in the slim injection molding apparatus of FIG. 16, and FIG. 19 is a cross-sectional view illustrating a state in which a lower core of a second core is moved and a second cavity is open in the slim injection molding apparatus of FIG. 16.

Referring to FIGS. 16 to 19, a slim injection molding apparatus 300 according to an embodiment of the present disclosure may include an intermediate plate 310, and a first core 300-1 and a second core 300-2 that are disposed on opposite side surfaces of the intermediate plate 310.

The intermediate plate 310 is a hot runner plate in which a hot runner system 311 is provided. The hot runner system 311 is formed to supply cavities 301 and 301' of the first core 300-1 and the second core 300-2 with injection material being supplied from one side of the first core 300-1. Further, the intermediate plate 310 is provided with a locking apparatus (not illustrated) to selectively or at the same time lock or release the first core 300-1 and the second core 300-2. The hot runner plate 310 and the locking apparatus provided in the intermediate plate 310 may use those of the conventional injection molding apparatus; therefore, detailed descriptions thereof will be omitted.

The first core 300-1 is disposed in one side surface of the intermediate plate 310 of the hot runner plate, and the second core 300-2 is disposed in the opposite side surface of the intermediate plate 310.

The first core 300-1 and the second core 300-2 include an upper core 320 and 320' and a lower core 330 and 330', respectively.

The upper core 320 of the first core 300-1 and the upper core 320' of the second core 300-2 are disposed in the opposite side surfaces of the intermediate plate 310. The lower core 330 of the first core 300-1 is fixed to one of the pair of clamping plates 11 of the injection machine 1000, and the lower core 330' of the second core 300-2 is fixed to the other of the pair of clamping plates 11 of the injection machine 1000.

The upper core 320 of the first core 300-1 is disposed in one side surface of the intermediate plate 310, and is provided with a product groove 321 corresponding to the shape of the certain injection product 5 in the surface of the upper core 320.

The lower core 330 of the first core 300-1 is formed to face the upper core 320, and a top surface of the lower core 330 is formed to correspond to the lower shape of the certain injection product 5. Accordingly, when the upper core 320 and the lower core 330 are coupled to each other, a cavity 301 having a shape corresponding to the shape of the certain injection product 5 is formed by the product groove 321 of the upper core 320 and the top surface of the lower core 330.

In detail, when the upper core 320 and the lower core 330 of the first core 300-1 are coupled to each other, the cavity 301 corresponding to the certain injection product 5 is formed by the product groove 321 of the upper core 320 and the top surface of the lower core 330 that face each other. An inner dimension of the cavity 301 corresponds to a dimension of the injection product 5. Accordingly, when molten plastic or resin of injection material is injected into the cavity 301 via the hot runner system 311 of the intermediate plate 310 and then is cooled, the certain injection product 5 is formed. The above-described hot runner system 311 of the intermediate plate 310 is extended to the upper core 320 to supply the product groove 321 of the upper core 320 with the injection material.

Further, a hot runner connection part 305 in fluid communication with the hot runner system 311 of the intermediate plate 310 is provided in a center of each of the upper core 320 and lower core 330 of the first core 300-1. Accordingly, the injection material being supplied from the injection machine 1000 is supplied to the hot runner system 111 of the intermediate plate 310 through the hot runner connection part 305 of the first core 300-1.

The lower core 330 of the first core 300-1 may be fixed to one of the pair of clamping plate 11 of the injection machine 1000 by a fixing plate 371. In other words, the fixing plate 371 is fixed to one side clamping plate 11 of the injection machine 1000, and the lower core 330 of the first core 300-1 is fixed to the fixing plate 371. In the present embodiment, the lower core 330 of the first core 300-1 is fixed to the clamping plate 11 by the fixing plate 371. Alternatively, the lower core 330 may be directly fixed to the clamping plate 11 without the fixing plate 371.

The ejecting core 350 of the first core 300-1 is disposed in the lower core 330 of the first core 300-1, and is formed to push up the injection product 5 formed in the cavity 301 of the first core 300-1 when the upper core 320 of the first core 300-1 is separated from the lower core 330 of the first core 300-1. In the present embodiment, the ejecting core 350 of the first core 300-1 is disposed to be moved upward and downward by the horizontal movement of the slide core 340 provided in the lower core 330 of the first core 300-1.

The slide core 340 is disposed to be slidably moved at opposite sides of the lower core 330 of the first core 300-1, and a leading end 341 of the slide core 340 forms a portion of the cavity 301 along with the product groove 321 of the upper core 320 of the first core 300-1 and an undercut groove of the lower core 330 of the first core 300-1. In detail, the leading end 341 of the slide core 340 may form the portion of the cavity 301 corresponding to an undercut portion 5-1 of the injection product 5.

The slide core 340 is disposed to slidably move with respect to the lower core 330 of the first core 300-1 and at a side of the ejecting core 350 disposed in the lower core 330 of the first core 300-1. When the upper core 320 and the lower core 330 of the first core 300-1 are coupled to each other, the slide core 340 is coupled between the upper core 320 and the lower core 330 of the first core 300-1, thereby forming the portion of the cavity 301 corresponding to the undercut 5-1 of the injection product 5. When the upper core 320 and the lower core 330 of the first core 300-1 are separated from each other, the slide core 340 is slidably moved in the lower core 330 of the first core 300-1 in a first direction (arrow A) away from the center C of the first core 300-1.

The slide core 340 is formed to be slidably moved by an angular pin 360 provided in the upper core 320 of the first core 300-1.

The angular pin 360 is provided in the upper core 320 outside the product groove 321 of the upper core 320 of the first core 300-1. The angular pin 360 is disposed to be downwardly inclined in the first direction (arrow A) in which the slide core 340 is moved away from the center C of the lower core 330.

The slide core 340 is provided with a guide hole 361 in which the angular pin 360 is movably inserted. The guide hole 361 is also formed to be downwardly inclined with respect to the first direction (arrow A). Accordingly, as illustrated in FIG. 18, when the angular pin 360 is moved in a side direction by separation of the upper core 320 and lower core 330 of the first core 300-1, the slide core 340 is moved by the angular pin 360 inserted in the guide hole 361. At this time, the slide core 340 is moved in the first direction (arrow A) away from the center C of the lower core 330 so that the leading end 341 of the slide core 340 is separated from the undercut groove of the lower core 330.

On the other hand, when the upper core 320 of the first core 300-1 approaches the lower core 330 of the first core 300-1, the angular pin 360 is inserted into the guide hole 361 of the slide core 340. When the upper core 320 further approaches the lower core 330, the slide core 340 is moved toward the center C of the lower core 330 by the angular pin 360 inserted in the guide hole 361. When the coupling of the upper core 320 and the lower core 330 of the first core 300-1 is completed, the leading end 341 of the slide core 340 moved by the angular pin 360 is coupled to the undercut groove of the lower core 330 and the product groove 321 of the upper core 120, thereby forming the cavity 301.

The ejecting core 350 is disposed in the lower core 330 of the first core 300-1, and is able to be moved by the slide core 340. In detail, when the upper core 320 of the first core 300-1 is separated from the lower core 330, the ejecting core 350 is projected from the top surface of the lower core 330 of the first core 300-1 to push up the injection product 5 formed in the cavity 301.

The ejecting core 350 is disposed to be slidably moved with respect to the lower core 330 inside the lower core 330 of the first core 300-1, and is formed to be moved integrally with the slide core 340 according to the movement of the slide core 340 as described above.

In detail, referring to FIGS. 16, 18, and 19, the ejecting core 350 may include an ejecting body 351 and an ejecting pin 355. The ejecting core 350 has a structure similar to that of the ejecting core 150 as illustrated in FIG. 6.

The ejecting body 351 is disposed below slide core 340 and inside the lower core 330 of the first core 300-1, and is formed to slidably move with respect to the lower core 330. Accordingly, the lower core 330 of the first core 300-1 is provided with an ejecting groove 333 in which the ejecting body 351 is inserted and moved in a side surface of the lower core 330.

A guide rail 352 for guiding the vertical movement of the ejecting pin 355 is formed in one side surface of the ejecting body 351. The guide rail 352 is formed to project from the one side surface of the ejecting body 351. The guide rail 352 is disposed to be inclined upward toward the top surface of the lower core 330. Also, a supporting portion 353 is provided parallel to the guide rail 352 below the guide rail 352. The supporting portion 353 supports the lower end of the ejecting pin 355, and allows the ejecting pin 355 to be slidably moved along the guide rail 352.

The ejecting pin 355 is provided in the one side surface of the ejecting body 351, and when the slide core 340 is moved away from the center C of the lower core 330 of the first core 300-1, the ejecting pin 355 is projected from the top surface of the lower core 330, thereby pushing up the injection product 5.

The ejecting pin 355 is provided with a guide groove, in which the guide rail 352 of the ejecting body 351 is inserted, in one side surface of the lower end portion of the ejecting pin 355 so that the ejecting pin 355 is disposed to slidably move with respect to the ejecting body 351. Accordingly, if the guide rail 352 is inserted in the guide groove, the ejecting pin 355 can slidably move along the guide rail 352. The guide groove formed in the ejecting pin 255 is similar to the guide groove 156 of the ejecting pin 155 of the slim injection molding apparatus 100 according to a first embodiment of the present disclosure as illustrated in FIG. 6.

Also, a receiving portion 357 on which the injection product 5 is received is provided at a top end portion of the ejecting pin 355. The receiving portion 357 is configured to form the cavity 301 along with the top surface of the lower core 330 of the first core 300-1. In other words, the receiving portion 357 of the ejecting pin 355 forms a portion of the top surface of the lower core 330 of the first core 300-1. Accordingly, the receiving portion 357 of the ejecting pin 355 forms the cavity 301 along with the product groove 321 of the upper core 320 of the first core 300-1, the top surface of the lower core 330 of the first core 300-1, and the leading end 341 of the slide core 340.

On the other hand, the lower core 330 of the first core 300-1 is provided with an ejecting hole 331 in which the ejecting pin 355 is inserted and moved upward and downward. The ejecting hole 331 is formed such that when the ejecting pin 355 is moved by the guide rail 352 of the ejecting body 351, the ejecting pin 355 can move upward and downward with respect to the lower core 330. The ejecting hole 331 may be formed perpendicular to the bottom surface of the lower core 330, or to have a predetermined inclination with respect to the bottom surface of the lower core 330.

Accordingly, when the ejecting pin 355 is located at the highest position of the guide rail 352, the ejecting pin 355 is projected from the top surface of the lower core 330 of the first core 300-1 through the ejecting hole 331 of the lower core 330. When the ejecting pin 355 is located at the lowest position, the ejecting pin 355 is lowered through the ejecting hole 331 so that the receiving portion 357 of the ejecting pin 355 is aligned with the top surface of the lower core 330 so as to form the cavity 301. When the ejecting pin 355 is projected from the top surface of the lower core 330, the receiving portion 357 of the ejecting pin 355 pushes up the injection product 5 formed in the cavity 301, thereby separating the injection product 5 from the lower core 330.

The ejecting core 350 is provided with a connection protrusion 354 formed on the top surface of the ejecting body 351 and the slide core 340 is provided with a connection groove 343, in which the connection protrusion 354 of the ejecting core 350 is inserted, in the bottom surface of the slide core 340 that is in contact with the ejecting core 350 so that the ejecting core 350 can be moved integrally with the slide core 340. Because the ejecting core 350 is connected to the slide core 340 by the connection protrusion 354, if the slide core 340 slidably moves with respect to the lower core 330 of the first core 300-1, the ejecting core 350 also is slidably moved with respect to the lower core 330 of the first core 300-1.

The second core 300-2 is disposed in the opposite side surface of the intermediate plate 310, and includes an upper core 320' and a lower core 330'. The structure of the second core 300-2 is the same as that of the first core 300-1 as described above; therefore, a detailed description thereof will be omitted. However, there is a difference that the upper core 320' and the lower core 330' of the second core 300-2 is not provided with the hot runner connection part 305 in fluid communication with the hot runner system 311 of the intermediate plate 310.

In the slim injection molding apparatus 300 according to an embodiment of the present disclosure with the above described structure, the intermediate plate 310, the upper core 320 and lower core 330 of the first core 300-1, and the upper core 320' and lower core 330' of the second core 300-2 as described above are formed to have a cross-section of a rectangular shape, respectively. A length and a width of each of the intermediate plate 310, the upper core 320 and lower core 330 of the first core 300-1, and the upper core 320' and lower core 330' of the second core 300-2 are the same.

In the present embodiment, the upper cores 320 and 320' of the first core 300-1 and the second core 300-2 are not disposed in the intermediate plate 310 by the upper molding plate, but directly disposed in the intermediate plate 310 unlike the conventional injection molding apparatus. Also, the lower cores 330 and 330' of the first core 300-1 and the second core 300-2 are not disposed in the fixing plates 371 and 372 through the lower molding plate, but directly disposed in the fixing plates 371 and 372 unlike the conventional injection molding apparatus. Accordingly, the slim injection molding apparatus 300 according to an embodiment of the present disclosure may reduce material cost and processing cost required to manufacture the upper molding plate and the lower molding plate.

Hereinafter, a case of implementing the slim injection molding apparatus 300 according to a third embodiment of the present disclosure having the above-described structure as a tandem injection molding apparatus will be described with reference to FIGS. 16 to 19.

The slim injection molding apparatus 300 according to the present embodiment is disposed between the pair of clamping plates 11 of the injection machine 1000 as illustrated in FIG. 17.

The lower core 330 of the first core 300-1 and the lower core 330' of the second core 300-2 are disposed in the clamping plates 11 of the injection machine 1000, respectively. The pair of clamping plates 11 moves the lower core 330 of the first core 300-1 and the lower core 330' of the second core 300-2, thereby alternately forming or opening the first cavity 301 of the first core 300-1 and the second cavity 301' of the second core 300-2.

In detail, when the lower core 330 of the first core 300-1 moves to be separated from the upper core 320 of the first core 300-1, as illustrated in FIG. 18, the first cavity 301 of the first core 300-1 is open, and thus a first injection product 5 formed in the first cavity 301 is ejected. At this time, the upper core 320 and the lower core 330 of the second core 300-2 are coupled to each other so that the second cavity 301' is not open.

When the lower core 330' of the second core 300-2 moves, as illustrated in FIG. 19, the lower core 330 of the first core 300-1 moves in the opposite direction so as to be coupled to the upper core 320 of the first core 300-1, and the lower core 330' of the second core 300-2 is separated from the upper core 320' of the second core 300-2 so that the second cavity 301' is open. At this time, the upper core 320 and the lower core 330 of the first core 300-1 keep the coupled state so that the first cavity 301 is not open.

When the upper core 320 and 320' and the lower core 330 and 330' of the first core 300-1 and the second core 300-2 are separated from each other, operation of the ejecting pin 355 and 355' of the ejecting core 350 and 350' to eject the injection product 5 by the slide core 340 and 340' is the same as that of the slim injection molding apparatus 100 according to a first embodiment of the present disclosure as described above. Therefore, a detailed description thereof will be omitted.

As described above, if the slim injection molding apparatus 300 according to the present embodiment is implemented as the tandem injection molding apparatus, the injection products 5 formed in each of the first cavity 301 and the second cavity 301' may be sequentially ejected.

Further, the slim injection molding apparatus 300 according to a third embodiment of the present disclosure having the above-described structure may be implemented as a stack injection molding apparatus.

Hereinafter, the case of using the slim injection molding apparatus 300 according to a third embodiment of the present disclosure having the above-described structure as a stack injection molding apparatus will be described with reference to FIGS. 16, 17, and 20.

Figure 20:
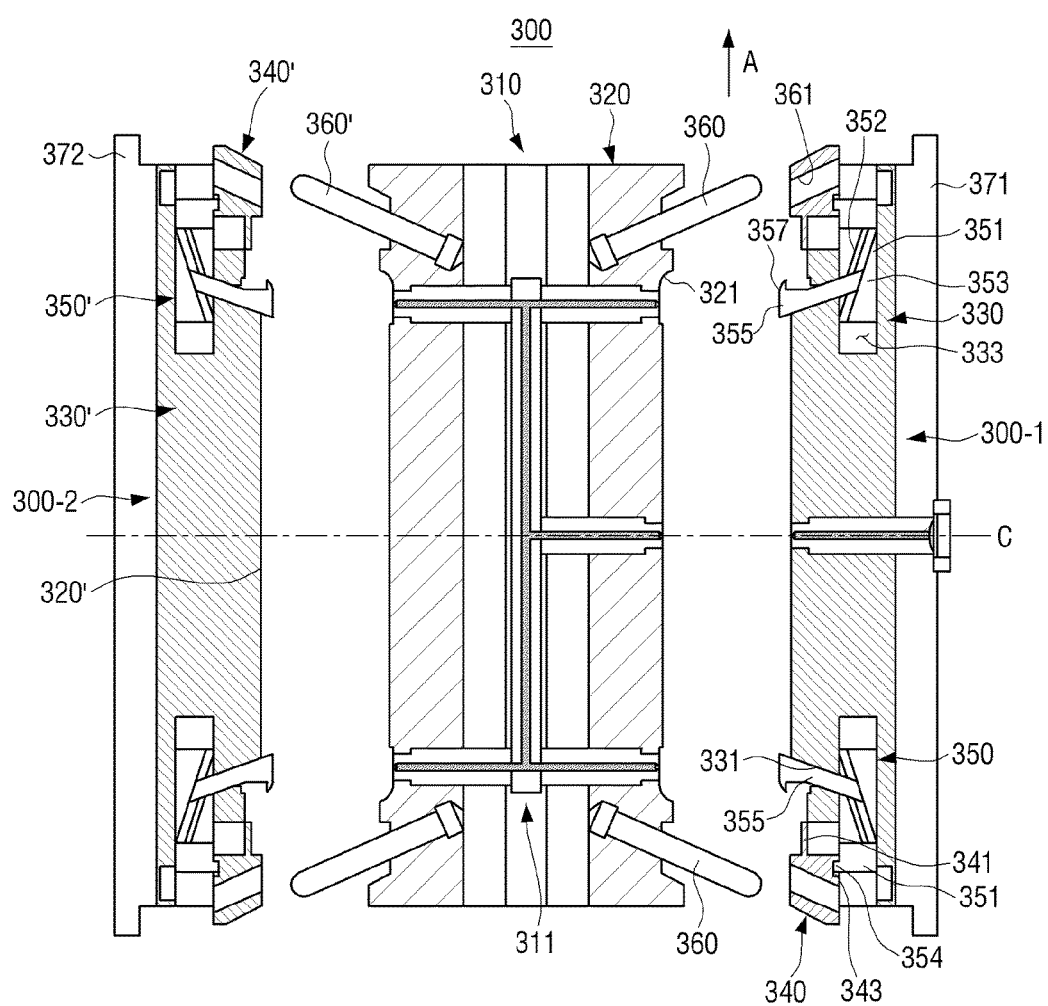
FIG. 20 is a cross-sectional view illustrating a state in which a lower core of a first core and a lower core of a second core are moved at the same time in the slim injection molding apparatus of FIG. 16 so that both a first cavity and a second cavity are opened.

FIG. 20 is a cross-sectional view illustrating a state in which a lower core 330 of a first core 300-1 and a lower core 330' of a second core 300-2 are moved at the same time in the slim injection molding apparatus of FIG. 16 so that both a first cavity 301 and a second cavity 301' are opened.

The slim injection molding apparatus 300 according to the present embodiment is disposed between the pair of clamping plates 11 of the injection machine 1000 as illustrated in FIG. 17.

The lower core 330 of the first core 300-1 and the lower core 330' of the second core 300-2 are disposed in the clamping plates 11 of the injection machine 1000, respectively. The pair of clamping plates 11 at the same time moves the lower core 330 of the first core 300-1 and the lower core 330' of the second core 300-2, thereby at the same time forming or opening the first cavity 301 of the first core 300-1 and the second cavity 301' of the second core 300-2.

In detail, while the injection products 5 are being formed in the first cavity 301 and the second cavity 301', the upper cores 320 and 320' and the lower cores 330 and 330' of the first core 300-1 and the second core 300-2 keep the coupled state as illustrated in FIG. 16.

When ejecting the injection products 5 formed in the first cavity 301 and the second cavity 301', the lower core 330 of the first core 300-1 and the lower core 330' of the second core 300-2 are moved at the same time by the movement of the pair of clamping plates 11. When each of the lower core 330 of the first core 300-1 and the lower core 330' of the second core 300-2 are separated from each of the upper core 320 of the first core 300-1 and the upper core 320' of the second core 300-2 by the movement of each of the lower core 330 of the first core 300-1 and the lower core 330' of the second core 300-2, as illustrated in FIG. 20, the first cavity 301 of the first core 300-1 and the second cavity 301' of the second core 300-2 are opened at the same time, and then the injection products 5 formed in the first cavity 301 and the second cavity 301' are ejected.

When ejecting of the injection product 5 is completed, the pair of clamping plate 11 is moved in the opposite direction to couple each of the lower core 330 of the first core 300-1 and the lower core 330' of the second core 300-2 to each of the upper core 320 of the first core 300-1 and the upper core 320' of the second core 300-2, thereby forming the first cavity 301 and the second cavity 301'.

When the upper core 320 and 320' and the lower core 330 and 330' of the first core 300-1 and the second core 300-2 are separated from each other, operation of the ejecting pin 355 and 355' of the ejecting core 350 and 350' to eject the injection product 5 by the slide core 340 and 340' is the same as that of the slim injection molding apparatus 100 according to a first embodiment of the present disclosure as described above. Therefore, a detailed description thereof will be omitted.

In the above description, the ejecting cores 350 and 350' of the first core 300-1 and the second core 300-2 configuring the slim injection molding apparatus 300 are actuated by the slide core 340 and 340', thereby ejecting the injection product 5.

However, the ejecting cores 350 and 350' of the first core 300-1 and the second core 300-2 configuring the slim injection molding apparatus 300 may be implemented to be actuated by ejector blocks, thereby ejecting the injection product.

Figure 21:
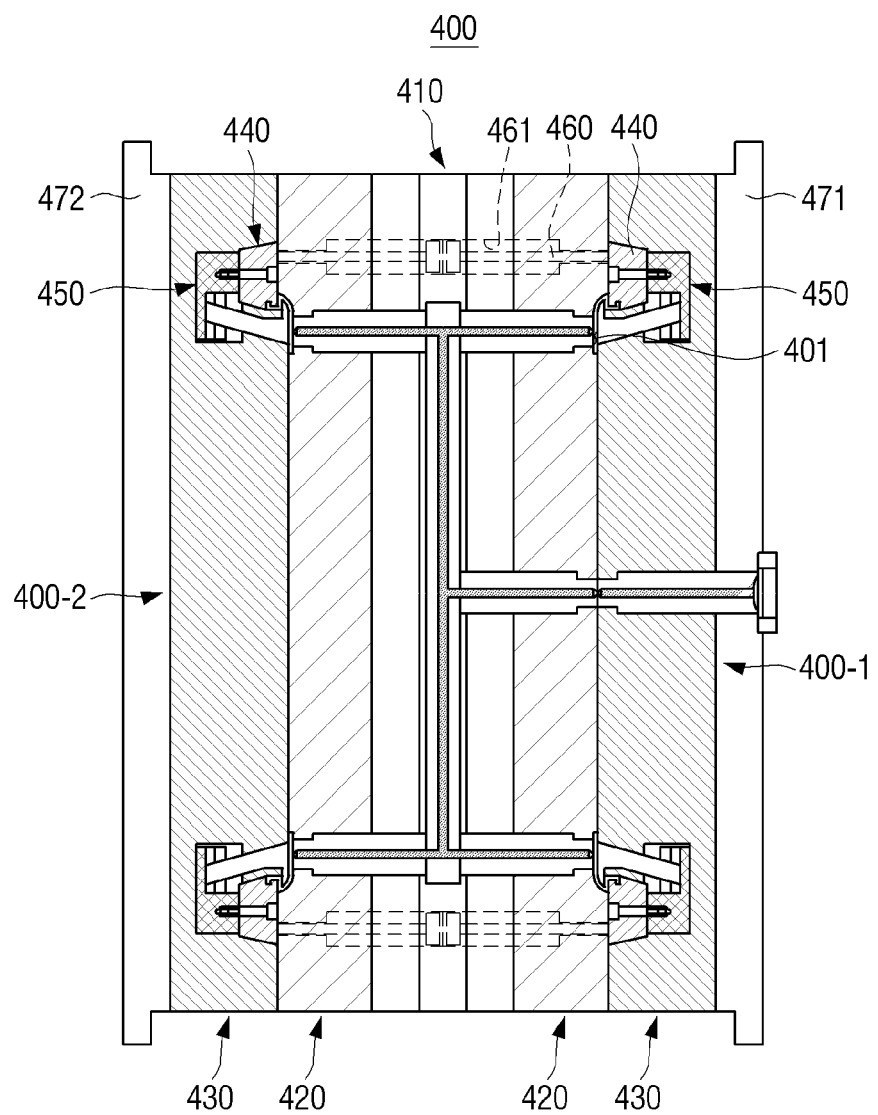
FIG. 21 is a cross-sectional view schematically illustrating a slim injection molding apparatus according to a fourth embodiment of the present disclosure.

FIG. 21 is a cross-sectional view schematically illustrating a slim injection molding apparatus according to a fourth embodiment of the present disclosure. An ejecting core 450 of each of a first core 400-1 and a second core 400-2 configuring a slim injection molding apparatus 400 according to an embodiment of the present disclosure is actuated by an ejector block 440.

The slim injection molding apparatus 400 according to an embodiment of the present disclosure may include an intermediate plate 410, and the first core 400-1 and the second core 400-2 that are disposed on opposite side surfaces of the intermediate plate 410.

The intermediate plate 410, the first core 400-1, and the second core 400-2 are similar to the slim injection molding apparatus 300, the first core 300-1, and the second core 300-2 of the slim injection molding apparatus 300 according to a third embodiment as described above. However, there is a difference that the ejector block 440 is used to actuate the ejecting core 450 instead of the slide core 340 that actuates the ejecting core 350 of the slim injection molding apparatus 300 according to the third embodiment. The ejector block 440 may be slidably moved by a lift member 460 disposed in a lift hole 461 of an upper core 420.

The structure of the slim injection molding apparatus 400 that actuates the ejecting core 450 of a lower core 430 of each of the first core 400-1 and the second core 400-2 using the ejector block 440 is the same as that of the slim injection molding apparatus 200 according to the second embodiment of the present disclosure as illustrated in FIGS. 10 to 15.

Accordingly, description for the structure of the slim injection molding apparatus 400 including the first core 400-1 and the second core 400-2 that use the ejector block 440 to actuate the ejecting core 450 will be omitted.

The slim injection molding apparatus 400 according to a fourth embodiment of the present disclosure as illustrated in FIG. 21 also may be implemented as a tandem injection molding apparatus and a stack injection molding apparatus in the same manner as the slim injection molding apparatus 300 according to the third embodiment.

As described above, because the slim injection molding apparatuses 300 and 400 according to an embodiment of the present disclosure eject the injection product 5 using the slide core 340 or the ejector block 440 forming the cavity 301 and 401, the separate spacer block 3131 and pushing plate 3141 disposed outside the lower molding plate 3111 and 3112 are not required unlike the conventional injection molding apparatus 3000. Accordingly, the length or height h of the slim injection molding apparatus 300 and 400 may be reduced.

Hereinafter, a slim injection molding apparatus 500 according to a fifth embodiment of the present disclosure will be described with reference to FIGS. 22 to 25.

Figure 22:
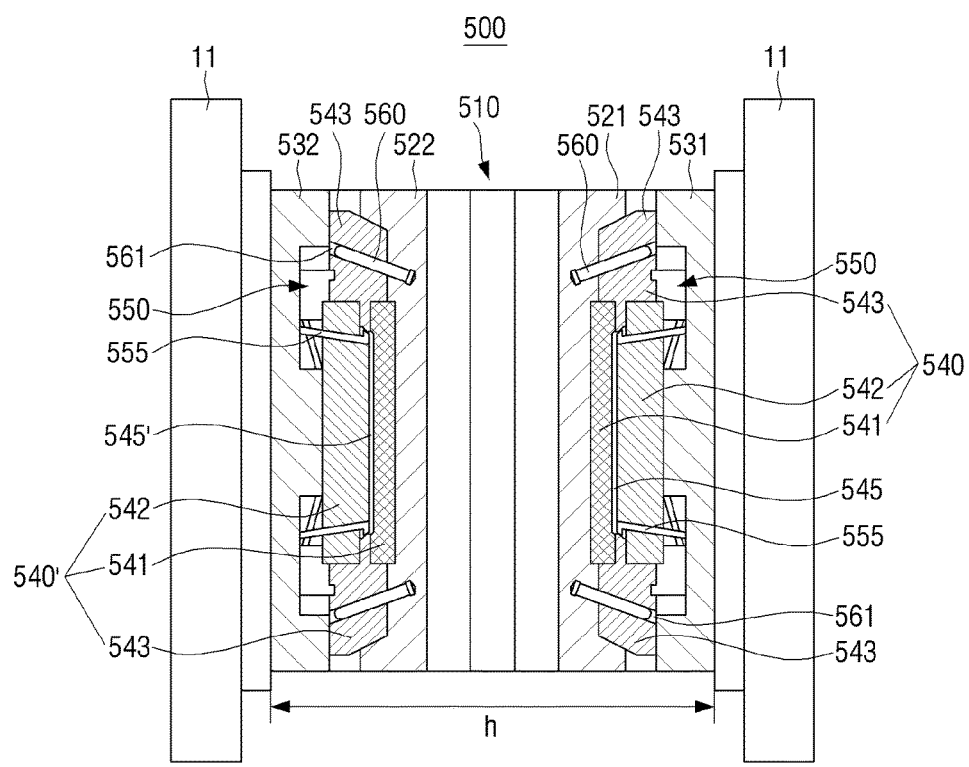
FIG. 22 is a cross-sectional view schematically illustrating a slim injection molding apparatus according to a fifth embodiment of the present disclosure.
Figure 23:
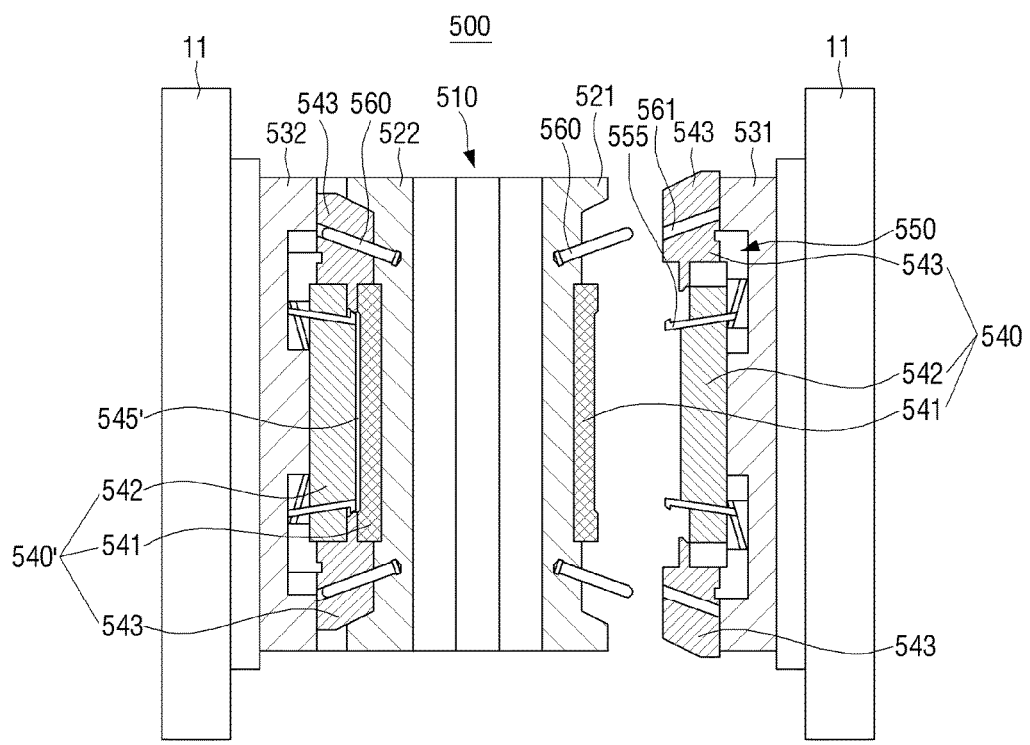
FIG. 23 is a cross-sectional view illustrating a state in which a first cavity is opened by movement of a first lower molding plate in the slim injection molding apparatus of FIG. 22.
Figure 24:
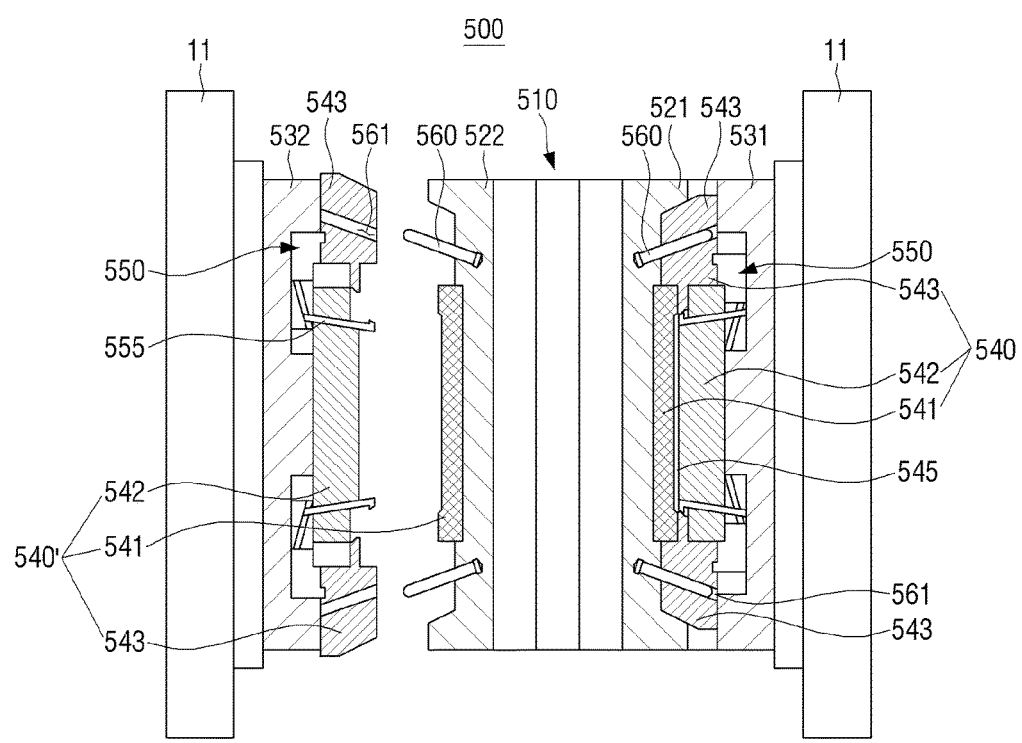
FIG. 24 is a cross-sectional view illustrating a state in which a second cavity is opened by movement of a second lower molding plate in the slim injection molding apparatus of FIG. 22.
Figure 25:
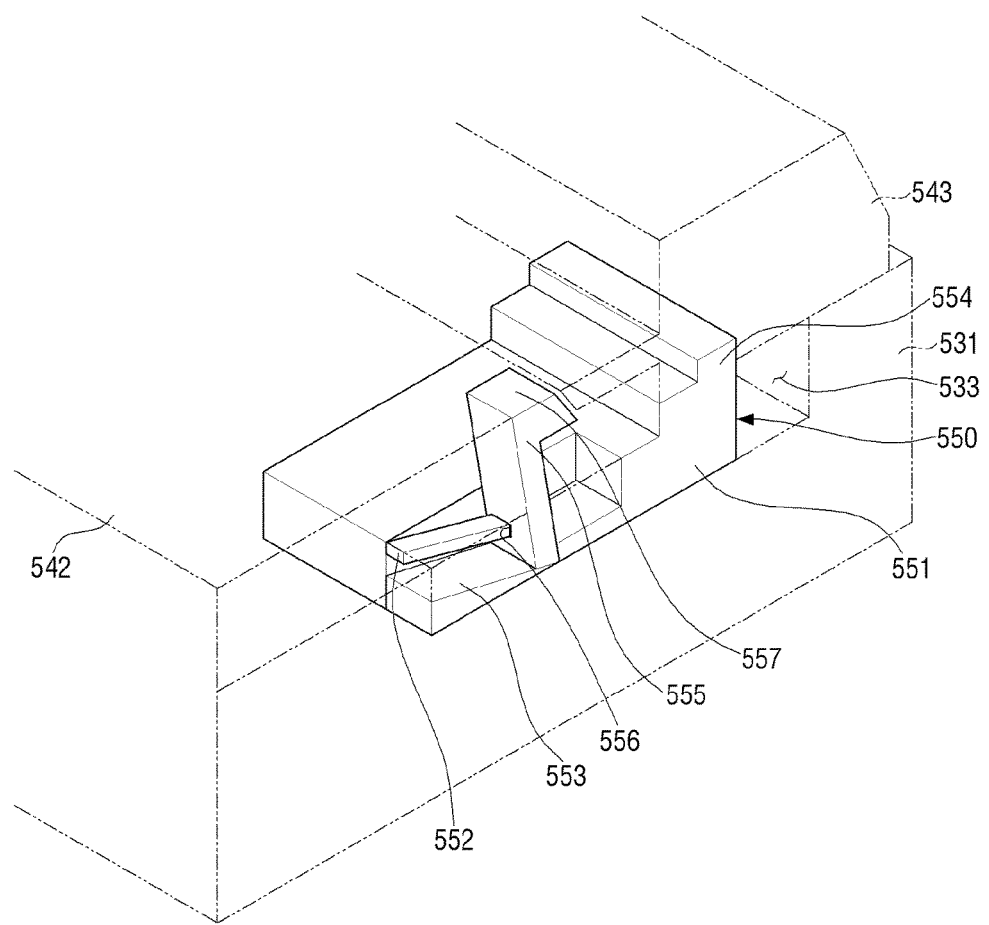
FIG. 25 is a perspective view illustrating an example of an ejecting core used in a slim injection molding apparatus according to a fifth embodiment of the present disclosure.

FIG. 22 is a cross-sectional view schematically illustrating a slim injection molding apparatus according to a fifth embodiment of the present disclosure. FIG. 23 is a cross-sectional view illustrating a state in which a first lower molding plate is moved and a first cavity is open in the slim injection molding apparatus of FIG. 22, and FIG. 24 is a cross-sectional view illustrating a state in which a second lower molding plate is moved and a second cavity is open in the slim injection molding apparatus of FIG. 22. FIG. 25 is a perspective view illustrating an ejecting core used in a slim injection molding apparatus according to a fifth embodiment of the present disclosure.

Referring to FIGS. 22 to 25, the slim injection molding apparatus 500 according to an embodiment of the present disclosure may include an intermediate plate 510, a first upper molding plate 521, a first lower molding plate 531, a second upper molding plate 522, and a second lower molding plate 532.

The intermediate plate 510 fixes the first upper molding plate 521 and the second upper molding plate 522, and is provided with a locking apparatus (not illustrated) for selectively locking or opening each of the first upper molding plate 521 and the second upper molding plate 522 with respect to each of the first lower molding plate 531 and the second lower molding plate 532. Also, the intermediate plate 510 is provided with a hot runner system (not illustrated) for supplying molten plastic. Accordingly, the intermediate plate 510 may be implemented as a hot runner plate provided with the hot runner system therein. Such an intermediate plate 510 is the same as or similar to the intermediate plate of the conventional injection molding apparatus; therefore, a detailed description thereof will be omitted.

The first upper molding plate 521 is disposed in one side surface of the intermediate plate 510, and is provided with an upper core 541 in a central portion thereof.

The first lower molding plate 531 is disposed to face the first upper molding plate 521, and is provided with a lower core 542 in a central portion thereof. Accordingly, when the first lower molding plate 531 and the first upper molding plate 521 are coupled to each other, a first installation space, in which a first core 540 to form a first cavity 545 is disposed, is formed.

The second upper molding plate 522 is disposed in an opposite side surface of the intermediate plate 510, and is provided with an upper core 541 in a central portion thereof.

The second lower molding plate 532 is disposed to face the second upper molding plate 522, and is provided with a lower core 542 in a central portion thereof. Accordingly, when the second lower molding plate 532 and the second upper molding plate 522 are coupled to each other, a second installation space, in which a second core 540' to form a second cavity 545' is disposed, is formed.

The clamping plate 11 is fixed to a bottom surface of each of the first lower molding plate 531 and the second lower molding plate 532. The pair of clamping plate 11 are provided in the injection machine 1000, and moves the first lower molding plate 531 and the second lower molding plate 532 to alternately form or open each of the first cavity 545 and the second cavity 545'.

In detail, when the first lower molding plate 531 is moved so that the lower core 542 is separated from the upper core 541 of the first upper molding plate 521, as illustrated in FIG. 23, the first cavity 545 is opened. At this time, the lower core 542 of the second lower molding plate 532 is coupled to the upper core 541 of the second upper molding plate 522 so that the second cavity 545' is not opened.

When the second lower molding plate 532 is moved, as illustrated in FIG. 24, the first lower molding plate 531 is moved in the opposite direction so as to be coupled to the first upper molding plate 521, and the lower core 542 of the second lower molding plate 532 is separated from the upper core 541 of the second upper molding plate 522 so that the second cavity 545' is opened. At this time, the lower core 542 of the first lower molding plate 531 is coupled to the upper core 541 of the first upper molding plate 521 so that the first cavity 545 is not opened.

As described above, the slim injection molding apparatus 500 according to an embodiment of the present disclosure may sequentially eject injection products formed in the first cavity 545 and the second cavity 545'.

Hereinafter, the first core 540 disposed in the first installation space between the first upper molding plate 521 and the first lower molding plate 531 and the second core 540' disposed in the second installation space between the second upper molding plate 522 and the second lower molding plate 532 will be described with reference to FIGS. 22 to 25. Since the first core 540 and the second core 540' have the same structure, hereinafter, only the first core 540 will be described.

The first core 540 may include an upper core 541, a lower core 542, a slide core 543, and an ejecting core 550.

The upper core 541 is disposed in the first upper molding plate 521 to face the lower core 542 disposed in the first lower molding plate 531. When the upper core 541 and the lower core 542 are coupled to each other, a cavity 545 having a shape corresponding to the shape of a certain injection product 5 may be formed.

In detail, when the upper core 541 and the lower core 542 are coupled to each other, the cavity 545 corresponding to the certain injection product 5 is formed in a surface in which the upper core 541 and the lower core 542 face each other. An inner dimension of the cavity 545 corresponds to a dimension of the injection product 5. Accordingly, when molten plastic or resin of injection material is injected to the cavity 545 and is cooled, the certain injection product 5 is formed.

The slide core 543 is disposed at opposite sides of the lower core 542. The slide core 543 is coupled to the upper core 541 and the lower core 542 so as to form a portion of the cavity 545. In detail, the slide core 543 may form the portion of the cavity 101 having a shape corresponding to an undercut portion 5-1 of the injection product 5.

The slide core 543 is disposed to slidably move with respect to the first lower molding plate 531 and at a side of the lower core 542. When the upper core 541 and the lower core 542 are coupled to each other, the slide core 543 is coupled between the upper core 541 and the lower core 542, thereby forming the portion of the cavity 101 corresponding to the undercut 5-1 of the injection product 5. When the upper core 541 and the lower core 542 are separated from each other, the slide core 543 is slidably moved in the top surface of the first lower molding plate 531 in a first direction (arrow A) away from the lower core 542.

Such a movement of the slide core 543 may be implemented by a variety of ways. In the present embodiment, a method of moving the slide core 543 by an angular pin 560 is used.

The angular pin 560 is provided in the first upper molding plate 521 outside the upper core 541. The angular pin 560 is disposed to be downwardly inclined in the first direction (arrow A) in which the slide core 543 is moved away from the lower core 542.

Figure 27:
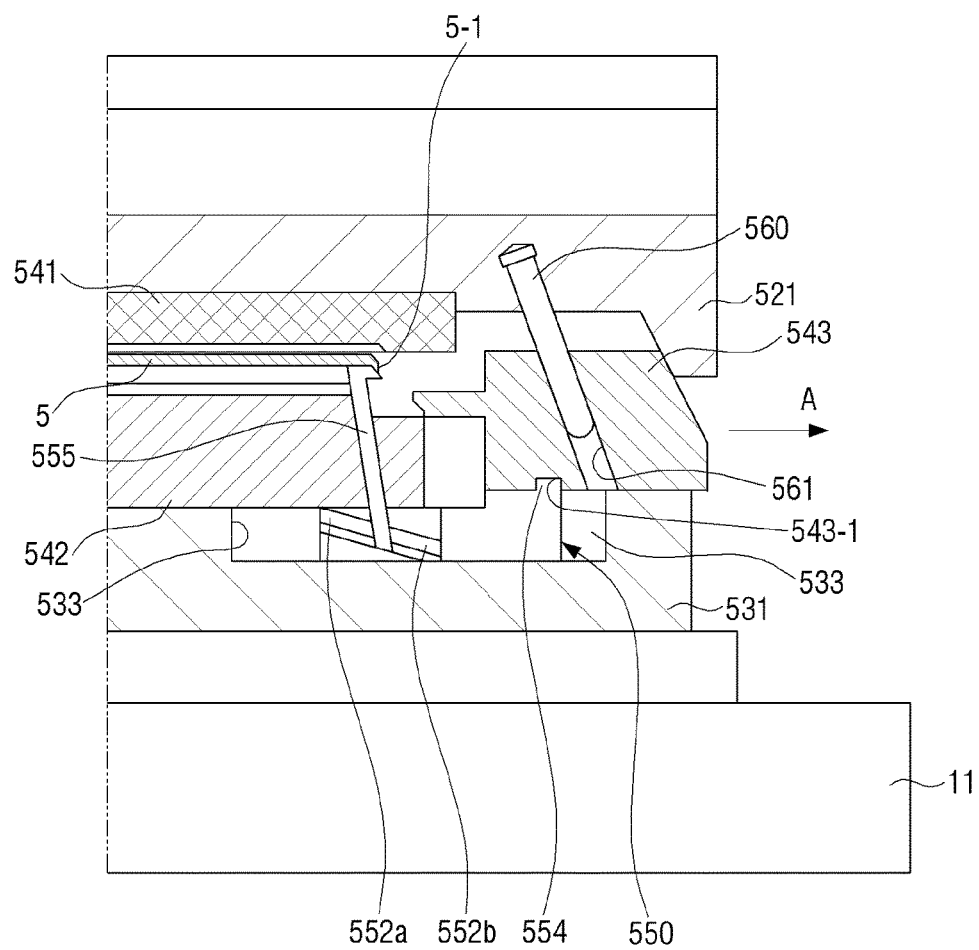
FIG. 27 is a partial cross-sectional view illustrating a state in which a lower core is being separated from the slim injection molding apparatus of FIG. 26.

The slide core 543 is provided with a guide hole 561 in which the angular pin 560 is movably inserted. The guide hole 561 is also formed to be downwardly inclined with respect to the first direction (arrow A). Accordingly, as illustrated in FIG. 27, when the angular pin 560 is raised by rising of the first upper molding plate 521, the slide core 543 is moved by the angular pin 560 inserted in the guide hole 561. At this time, the slide core 543 is moved in the first direction (arrow A) away from the lower core 542 so that the slide core 543 is separated from the lower core 542.

On the other hand, when the first upper molding plate 521 is lowered, the angular pin 560 is inserted into the guide hole 561 of the slide core 543. When the first upper molding plate 521 is further lowered, the slide core 543 is moved toward the lower core 542 by the angular pin 560 inserted in the guide hole 561. When the lowering of the first upper molding plate 521 is completed, the slide core 543 moved by the angular pin 560 is coupled to the lower core 542 and the upper core 541, thereby forming the cavity 545.

In the above-description, the slide core 543 is moved by the angular pin 560 disposed in each the first upper molding plate 521 and the second upper molding plate 522. However, the moving method of the slide core 543 is not limited thereto. Although not illustrated, the slide core 543 may be configured to be moved by a hydraulic cylinder or an air cylinder disposed in a side of the slide core 543.

The ejecting core 550 is disposed in the first lower molding plate 531, and is able to be moved by the slide core 543. In detail, when the upper core 541 and the slide core 543 are separated from the lower core 542, the ejecting core 550 is projected from the top surface of the lower core 542 to push up the injection product 5 formed in the cavity 545.

The ejecting core 550 is disposed to be slidably moved with respect to the first lower molding plate 531 below the lower core 542 and the slide core 543, and is formed to be moved integrally with the slide core 543.

The ejecting core 550 may include an ejecting body 551 and an ejecting pin 555.

The ejecting body 551 is disposed below the lower core 542 and the slide core 543, and is formed to slidably move with respect to the first lower molding plate 531 and the lower core 542 fixed to the first lower molding plate 531. Accordingly, the first lower molding plate 531 is provided with an ejecting groove 533 in which the ejecting body 551 is inserted and moved.

A guide rail 552 for guiding the vertical movement of the ejecting pin 555 is formed in one side surface of the ejecting body 551. The guide rail 552 is formed to project from the one side surface of the ejecting body 551. The guide rail 552 is disposed to be inclined upward toward the bottom surface of the lower core 542. Also, a supporting portion 553 is provided parallel to the guide rail 552 below the guide rail 552. The supporting portion 553 supports the lower end of the ejecting pin 555, and allows the ejecting pin 555 to slidably move along the guide rail 552.

The ejecting pin 555 is provided with a guide groove 556, in which the guide rail 552 of the ejecting body 551 is inserted, in one side surface of the lower end portion of the ejecting pin 555 so that the ejecting pin 555 is disposed to slidably move with respect to the ejecting body 551. Accordingly, if the guide rail 552 is inserted in the guide grooves 556, the ejecting pin 555 may be slidably moved along the guide rail 552.

Also, a receiving portion 557 on which the injection product 5 is received is provided at a top end portion of the ejecting pin 555. The receiving portion 557 is configured to form the cavity 545 along with the top surface of the lower core 542. In other words, the receiving portion 557 of the ejecting pin 555 forms the cavity 545 along with the upper core 541, the lower core 542, and the slide core 543.

On the other hand, the lower core 542 is provided with an ejecting hole 542-1 in which the ejecting pin 555 is inserted and moved upward and downward. The ejecting hole 542-1 is formed such that when the ejecting pin 555 is moved by the guide rail 552 of the ejecting body 551, the ejecting pin 555 can be moved upward and downward with respect to the lower core 542. The ejecting hole 542-1 may be formed perpendicular to the bottom surface of the lower core 542, or to have a predetermined inclination with respect to the bottom surface of the lower core 542.

Accordingly, when the ejecting pin 555 is located at the highest position 552a of the guide rail 552, the ejecting pin 555 is projected from the top surface of the lower core 542 through the ejecting hole 542-1 of the lower core 542. When the ejecting pin 555 is located at the lowest position 552b, the ejecting pin 555 is lowered through the ejecting hole 542-1 so that the receiving portion 557 of the ejecting pin 555 is matched with the top surface of the lower core 542 so as to form the cavity 545. When the ejecting pin 555 is projected from the top surface of the lower core 542, the receiving portion 557 of the ejecting pin 555 pushes up the injection product 5 formed in the cavity 545, thereby separating the injection product 5 from the lower core 542.

The ejecting core 550 is provided with a connection protrusion 554 on the top surface of the ejecting body 551, and the slide core 543 is provided with a connection groove 543-1, in which the connection protrusion 554 of the ejecting core 550 is inserted, in the bottom surface of the slide core 543 that is in contact with the ejecting core 550 so that the ejecting core 550 can be moved integrally with the slide core 543. Because the ejecting core 550 is connected to the slide core 543 by the connection protrusion 554, if the slide core 543 slidably moves with respect to the first lower molding plate 531, the ejecting core 550 also is slidably moved with respect to the first lower molding plate 531.

In the above-description and FIG. 25, the ejecting core 550 has a single ejecting pin 555 provided in the one side surface of the ejecting body 551. However, if the size of the injection product 5 is large, two ejecting pins 555 may be disposed symmetrically in opposite side surfaces of the ejecting body 551.

Hereinafter, operation of the slim injection molding apparatus 500 according to an embodiment of the present disclosure having the structure as described above will be described with reference to FIGS. 26, 27, and 28.

Figure 26:
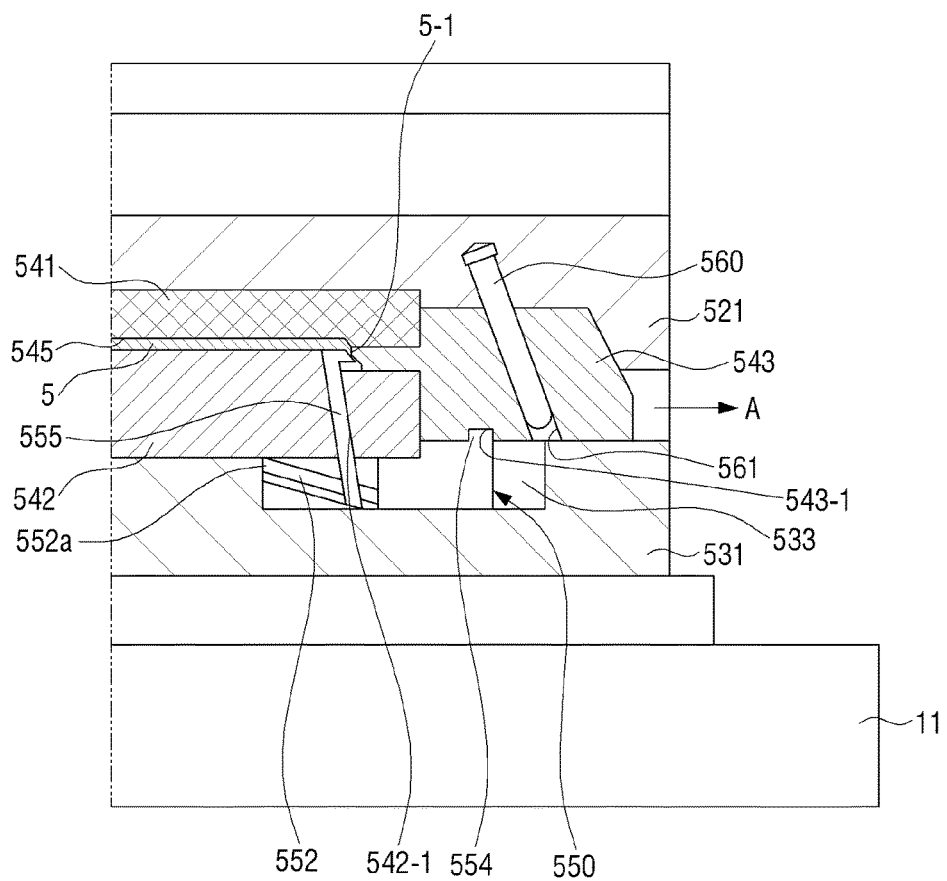
FIG. 26 is a partial cross-sectional view illustrating a state in which an upper core, a lower core, and a slide core of a slim injection molding apparatus according to a fifth embodiment of the present disclosure are coupled to each other.
Figure 28:
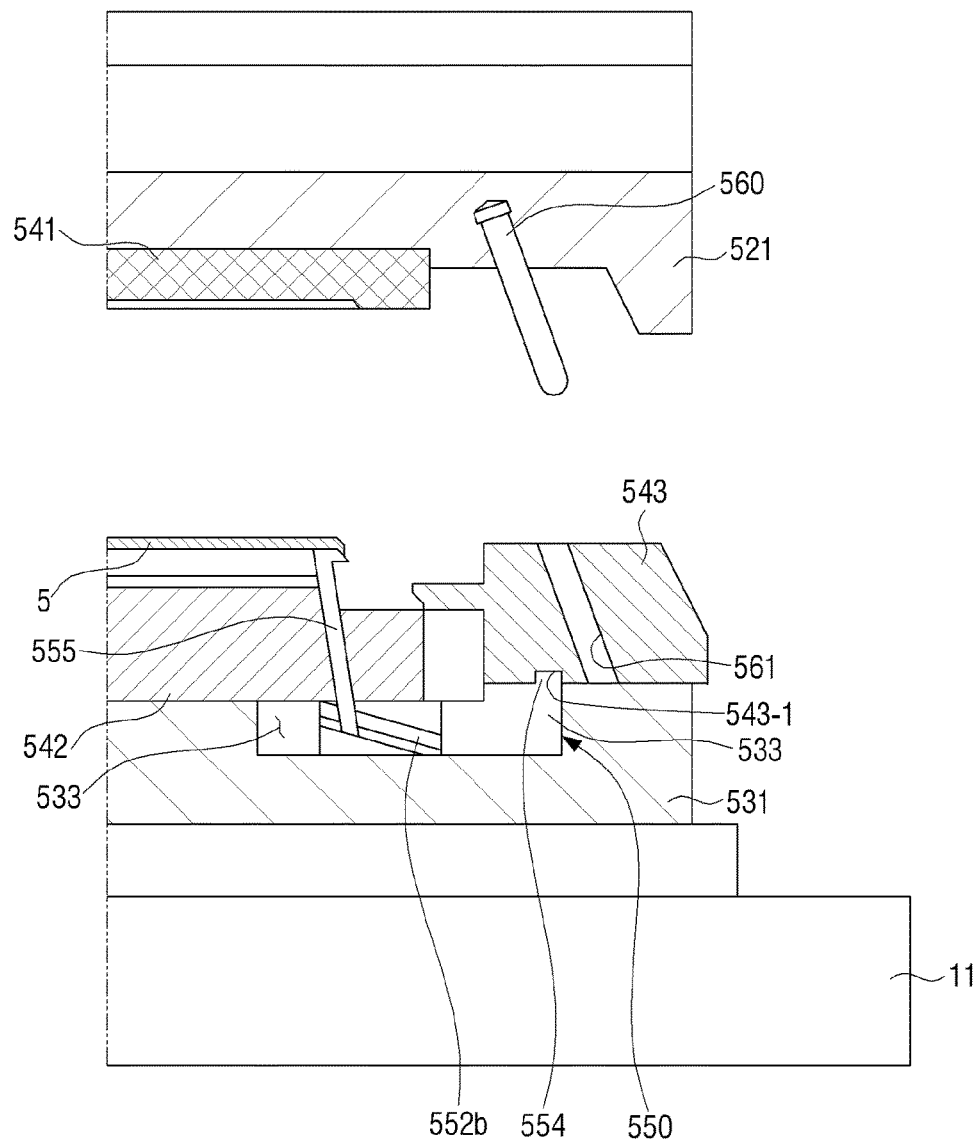
FIG. 28 is a partial cross-sectional view illustrating a state in which a lower core and a slide core are completely separated from an upper core in the slim injection molding apparatus of FIG. 26.

FIG. 26 is a partial cross-sectional view illustrating a state in which an upper core, a lower core, and a slide core of a slim injection molding apparatus according to a fifth embodiment of the present disclosure are coupled to each other. FIG. 27 is a partial cross-sectional view illustrating a state in which a lower core is being separated from the slim injection molding apparatus of FIG. 26. FIG. 28 is a partial cross-sectional view illustrating a state in which a lower core and a slide core are completely separated from an upper core in the slim injection molding apparatus of FIG. 26.

Referring to FIG. 26, the upper core 541, the lower core 542, the slide core 543, and the ejecting core 550 form the cavity 545 corresponding to an injection product 5 to be manufactured. In this state, the injection machine 1000 (see FIG. 17) performs an injection operation to inject molten plastic or resin of the injection material into the cavity 545.

After the injection of the molten plastic or resin into the cavity 545 is completed and a certain cooling time elapses, the lower molding plate 531 is moved so that the injection product 5 is ejected from the cavity 545.

In detail, as illustrated in FIG. 27, as the upper molding plate 521 starts to be separated from the lower molding plate 531, the angular pin 560 provided in the upper molding plate 521 also begins to rise integrally with the upper molding plate 521. When the angular pin 560 rises, the slide core 543 is moved in the first direction (arrow A) away from the lower core 542 by the angular pin 560 inserted into the guide hole 561.

As the slide core 543 starts to move in the first direction (arrow A), the ejecting core 550 disposed below the slide core 543 also begins to move in the first direction (arrow A) integrally with the slide core 543. As the ejecting core 550 starts to move in the first direction (arrow A), the ejecting pin 555 begins to be raised by the guide rail 552 formed in the ejecting core 550. As the ejecting pin 555 starts to rise, the receiving portion 557 of the ejecting pin 555 begins to project from the top surface of the lower core 542.

As illustrated in FIG. 28, when the upper core 541 is fully raised, the slide core 543 is moved in the first direction (arrow A) so that the slide core 543 is completely separated from the lower core 542. At this time, because the ejecting core 550 disposed below the slide core 543 also is moved maximally in the first direction (arrow A), the ejecting pin 555 is located at the highest position 552a of the guide rail 552 of the ejecting core 550. Thus, the ejecting pin 555 is projected through the ejecting hole 542-1 of the lower core 542, thereby separating the injection product 5 from the lower core 542. At this time, the injection product 5 is separated from the lower core 542 in a state of being received on the receiving portion 557 of the ejecting pin 555.

In the above description, the first upper molding plate 521 is moved upward and downward; however, movement of the first upper molding plate 521 is not limited thereto. According to a way in which the injection molding apparatus 500 is disposed in the injection machine, one of the first lower molding plate 531 and the second lower molding plate 532 may be moved in a horizontal direction so that the lower core 542 is separated from or coupled to the upper core 541.

In the above description and FIGS. 22 to 28, the slim injection molding apparatus 500 according to an embodiment of the present disclosure is implemented as the tandem injection molding apparatus.

However, the slim injection molding apparatus 500 according to an embodiment of the present disclosure may be applied to a stack injection molding apparatus. An example of the slim injection molding apparatus 500 according to an embodiment of the present disclosure implemented as a stack injection molding apparatus is illustrated in FIG. 29.

Figure 29:
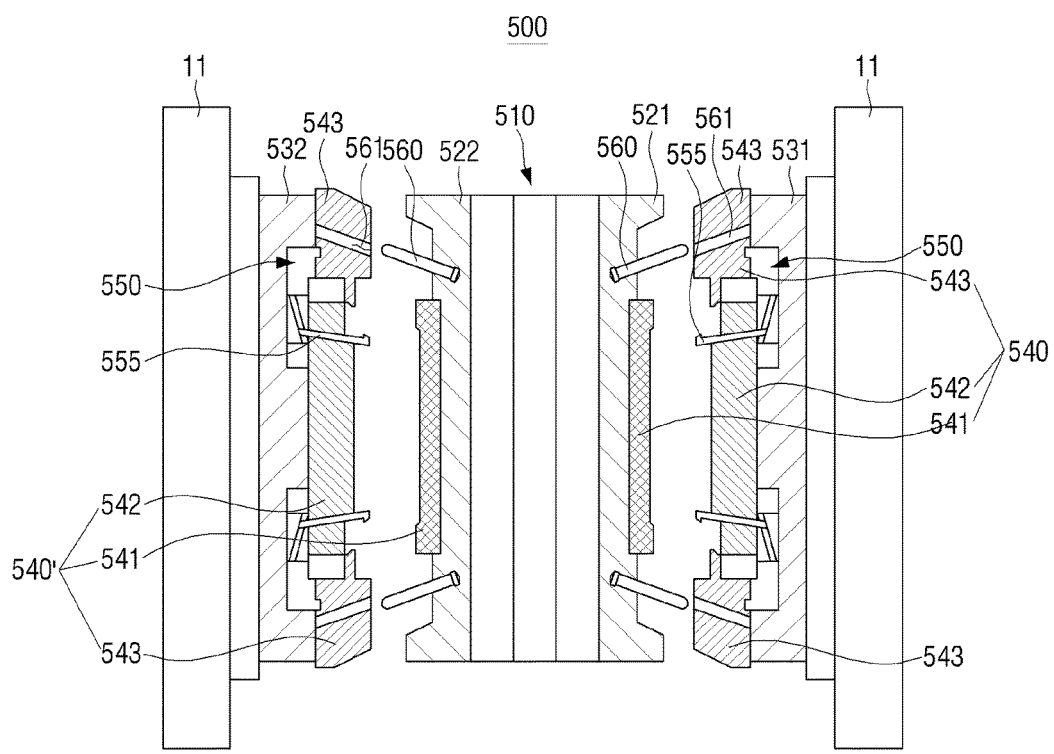
FIG. 29 is a cross-sectional view illustrating a state in which both a first cavity and a second cavity are open when the slim injection molding apparatus of FIG. 22 is used as a stack injection molding apparatus.

FIG. 29 is a cross-sectional view illustrating a state in which both a first cavity 545 and a second cavity 545 are opened when the slim injection molding apparatus 500 of FIG. 22 is used as a stack injection molding apparatus.

As illustrated in FIG. 29, the structure of the slim injection molding apparatus 500 according to an embodiment of the present disclosure implemented as the stack injection molding apparatus is the same as that of the slim injection molding apparatus 500 according to the fifth embodiment of the present disclosure as described above. However, there is a difference that the first and second cavity 545 and 545' of the first core 540 and the second core 540' are controlled to be opened or closed at the same time.

As described above, because the slim injection molding apparatus 500 according to an embodiment of the present disclosure ejects the injection product 5 using the slide core 543 forming the cavity 545, the separate spacer block 3131 and pushing plate 3141 disposed outside the lower molding plate 3111 and 3112 are not required unlike the conventional injection molding apparatus 3000. Accordingly, the length or height h of the slim injection molding apparatus 500 may be reduced.

Also, because the slim injection molding apparatus 500 according to an embodiment of the present disclosure has a low height h, it may be applied to conventional and normal injection machines.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. An injection molding apparatus usable in an injection machine to form an injection product, the injection molding apparatus comprising:
   a hot runner plate attachable to a first clamping member of the injection machine and provided with a hot runner system;
   an upper core disposed in the hot runner plate;
   a lower core attachable to a second, opposite clamping member of the injection machine to face the upper core, the lower core configured to be coupled to the upper core to define a mold cavity in which the injection product is formed;
   an ejecting core disposed in the lower core, the ejecting core configured to push the injection product upward when the upper core is separated from the lower core; and
   an ejector block disposed in the lower core,
   wherein:
   the ejecting core is moved upward and downward by a vertical movement of the ejector block,
   the upper core comprises a lift member that is vertically movable,
   one end of the lift member is connected to the ejector block, and another end of the lift member is inserted in a lift hole formed in the upper core, and
   when the upper core is lifted, the ejector block is lifted by the lift member.

2. The injection molding apparatus of claim 1, wherein each of the hot runner plate, the upper core, and the lower core have substantially a same width and substantially a same length.

3. The injection molding apparatus of claim 1, further comprising:
   a slide core disposed in the lower core,
   wherein the ejecting core is moved upward and downward by a horizontal movement of the slide core.

4. The injection molding apparatus of claim 3, wherein the ejecting core comprises:
   an ejecting body disposed to slidably move in the lower core; and an ejecting pin disposed in one side surface of the ejecting body, the ejecting pin configured to be projected from a top surface of the lower core and to push the injection product upward when the slide core moves away from a center of the lower core.

5. The injection molding apparatus of claim 4, wherein the ejecting body is provided with a guide rail inclined upward toward the top surface of the lower core, and an end portion of the ejecting pin is provided with a guide groove in which the guide rail is inserted, and when the ejecting body is moved by the slide core, the ejecting pin is moved along the guide rail.

6. The injection molding apparatus of claim 4, wherein an end portion of the ejecting pin is provided with a receiving portion on which the injection product is received, and the receiving portion forms the cavity along with the upper core, the lower core, and the slide core.

7. The injection molding apparatus of claim 4, wherein the lower core comprises an ejecting hole in which the ejecting pin is movably inserted.

8. The injection molding apparatus of claim 4, wherein the upper core comprises an angular pin, and the slide core comprises a guide hole into which the angular pin is movably inserted, and when the upper core moves, the slide core is moved by the angular pin inserted in the guide hole.

9. The injection molding apparatus of claim 8, wherein the angular pin is inclined, from a downward direction, in a first direction in which the slide core moves away from a center of the lower core, and when the upper core is separated from the lower core, the slide core and the ejecting body of the ejecting core are moved in the first direction and the ejecting pin is projected from the top surface of the lower core.

10. The injection molding apparatus of claim 1, further comprising:

first and second fixing plates to fix the upper and lower cores, respectively, to the first and the second clamping members, respectively.

11. The injection molding apparatus of claim 1, wherein the ejector block is disposed to be vertically moved in an ejector groove formed in the lower core, and forms a portion of the cavity with the lower core, and the ejecting core comprises an ejecting pin disposed in a side of the ejector block, the ejecting pin formed to be projected from the top surface of the lower core and to push up the injection product when the ejector block is lifted; and an ejecting body disposed below the ejector block and connected to the ejecting pin.

12. An injection machine using the injection molding apparatus of claim 1.

13. An injection molding apparatus usable in an injection machine to form an injection product, the injection molding apparatus comprising:

a hot runner plate provided with a hot runner system;

a first core disposed in or on a first surface of the hot runner plate; and a second core disposed in or on a second surface of the hot runner plate opposite to the first surface, wherein each of the first core and the second core comprises an upper core disposed in the hot runner plate, a lower core attachable to a clamping member of the injection machine to face the upper core, the lower core configured to be coupled to the upper core to define a mold cavity in which the injection product is formed, and an ejecting core disposed in the lower core, the ejecting core configured push the injection product upward when the upper core is separated from the lower core, and wherein:

the ejecting core is moved upward and downward by a vertical movement of an ejector block disposed in the lower core, the upper core comprises a lift member that is vertically movable, one end of the lift member is connected to the ejector block, and another end of the lift member is inserted in a lift hole formed in the upper core, and when the upper core is lifted, the elector block is lifted by the lift member.

14. The injection molding apparatus of claim 13, wherein each of the hot runner plate, the upper core, and the lower core have substantially a same width and substantially a same length.

15. The injection molding apparatus of claim 13, further comprising:

a slide core disposed in the lower core, wherein the ejecting core is moved upward and downward by a horizontal movement of the slide core.

16. The injection molding apparatus of claim 15, wherein the ejecting core comprises, an ejecting body disposed to move with respect to the lower core; and an ejecting pin disposed in one side surface of the ejecting body, the ejecting pin configured to project from a top surface of the lower core and to push the injection product upward when the slide core is away from a center of the lower core.

17. The injection molding apparatus of claim 16, wherein the ejecting body is provided with a guide rail inclined upward toward a bottom surface of the lower core, and the ejecting pin is provided with a guide groove in which the guide rail is inserted at an end portion of the ejecting pin, and when the ejecting body is moved by the slide core, the ejecting pin is moved along the guide rail.

18. The injection molding apparatus of claim 15, wherein the upper core comprises an angular pin, and the slide core comprises a guide hole in which the angular pin is movably inserted, when the upper core moves, the slide core is moved by the angular pin inserted in the guide hole, and the angular pin is disposed to be inclined, from a downward direction, in a first direction in which the slide core moves away from a center of the lower core.

19. The injection molding apparatus of claim 13, wherein the ejector block is disposed to be vertically moved in an ejector groove formed in the lower core, and forms a portion of the cavity with the lower core, and wherein the ejecting core comprises an ejecting pin disposed in a side of the ejector block, the ejecting pin formed to be projected from the top surface of the lower core and to push up the injection product when the ejector block is lifted; and an ejecting body disposed below the ejector block and connected to the ejecting pin.

20. The injection molding apparatus of claim 13, wherein the injection molding apparatus comprises a tandem injection molding apparatus, and wherein a cavity of the first core and a cavity of the second core are sequentially opened and closed.

21. The injection molding apparatus of claim 13, wherein the injection molding apparatus comprises a stack injection molding apparatus, and
the cavity of the first core and the cavity of the second core are opened and closed concurrently.

22. The injection molding apparatus of claim 13, further comprising:
a first upper molding plate disposed between the first core and the one side surface of the hot runner plate;
a first lower molding plate disposed between the first core and the clamping member to face the first upper molding plate;
a second upper molding plate disposed between the second core and the opposite side surfaces of the hot runner plate; and
a second lower molding plate disposed between the second core and the clamping member to face the second upper molding plate.

23. An injection molding apparatus usable in an injection machine, the injection molding apparatus comprising:
a first core;
a second core configured to, when the injection molding apparatus is disposed in the injection machine, be coupled to the first core to define a mold cavity and to be separated from the first core by operation of the injection machine;
a hot runner system disposed in the first core and configured to, when the injection molding apparatus is disposed in the injection machine, direct an injection material to the mold cavity to form an injection product in the mold cavity;
an ejecting core disposed in the second core and configured such that, when the injection molding apparatus is disposed in the injection machine and the injection product has been formed in the mold cavity, a separating motion in which the first core and the second core separate from each other causes the ejecting core to push the injection product away from the second core;
an angular pin protruded out of the first core and toward the second core, the angular pin being angled laterally outward from a center of the first core; and
a slide core disposed in the second core and movable in a laterally outward direction away from a center of the second core, the slide core having
a supporting portion having an inclined surface supporting a part of the ejecting core on the inclined surface, and
a guide hole to receive the angular pin such that the separating motion causes movement of the slide core in the laterally outward direction, which causes the inclined surface to push the electing core to push the injection product pushed away from the second core.

24. The injection molding apparatus of claim 23, further comprising:
a lift member being, at least in part, retracted into the first core when the first core is coupled to the second core and having an end portion attached to the ejecting core, wherein the lift member is configured to extend a distance out of the first core when the first core is separated from the second core by the separating motion, and, upon the lift member having extended the distance out of the first core, to pull the ejecting core away toward the first core such that the injection product to be pushed away from the second core.

* * * * *